(12) United States Patent
Mikuni

(10) Patent No.: US 9,762,891 B2
(45) Date of Patent: Sep. 12, 2017

(54) TERMINAL DEVICE, IMAGE SHOOTING SYSTEM AND IMAGE SHOOTING METHOD

(71) Applicant: NEC CASIO Mobile Communications, Ltd., Kanagawa (JP)

(72) Inventor: Shin Mikuni, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 275 days.

(21) Appl. No.: 14/380,752

(22) PCT Filed: Jan. 28, 2013

(86) PCT No.: PCT/JP2013/051703
§ 371 (c)(1),
(2) Date: Aug. 25, 2014

(87) PCT Pub. No.: WO2013/125298
PCT Pub. Date: Aug. 29, 2013

(65) Prior Publication Data
US 2015/0009297 A1 Jan. 8, 2015

(30) Foreign Application Priority Data

Feb. 23, 2012 (JP) .................................. 2012-037348

(51) Int. Cl.
*H04N 13/02* (2006.01)
*G03B 17/18* (2006.01)
(Continued)

(52) U.S. Cl.
CPC ......... *H04N 13/0221* (2013.01); *G03B 17/18* (2013.01); *G03B 35/08* (2013.01); *G06T 19/20* (2013.01); *H04N 5/23293* (2013.01); *H04N 13/0239* (2013.01); *H04N 13/0246* (2013.01); *H04N 13/0296* (2013.01); *G06T 2200/04* (2013.01); *G06T 2207/10004* (2013.01); *G06T 2207/20132* (2013.01); *G06T 2207/20221* (2013.01); *G06T 2219/2004* (2013.01)

(58) Field of Classification Search
None
See application file for complete search history.

(56) References Cited

U.S. PATENT DOCUMENTS

2008/0193120 A1* 8/2008 Nishimoto ............... G03B 7/26
396/280
2011/0267432 A1* 11/2011 Kumakura ........... H04N 5/2252
348/47

FOREIGN PATENT DOCUMENTS

JP 64-086129 3/1989
JP 08-317424 11/1996
(Continued)

OTHER PUBLICATIONS

Extended European search report, dated Sep. 1, 2015; Application No. 13751467.5.
International Search Report, PCT/JP2013/051703, Apr. 16, 2013.

*Primary Examiner* — James M Anderson, II
(74) *Attorney, Agent, or Firm* — Young & Thompson

(57) ABSTRACT

A terminal device used for stereo imaging includes: an image shooting unit; a communication unit that receives a first image of a first angular field from an external terminal device; and a determination unit that determines the image shooting range relationship between the first image received by the communication unit and a second image of a second angular field shot by the image shooting unit, the second angular field being wider than the first angular field.

9 Claims, 12 Drawing Sheets

(51) Int. Cl.
*G03B 35/08* (2006.01)
*G06T 19/20* (2011.01)
*H04N 5/232* (2006.01)

(56) References Cited

FOREIGN PATENT DOCUMENTS

| | | |
|---|---|---|
| JP | 08-317425 | 11/1996 |
| JP | 10-186549 | 7/1998 |
| JP | 10-224823 | 8/1998 |
| JP | 2001-008089 | 1/2001 |
| JP | 2003-309861 | 10/2003 |
| JP | 2004-235783 | 8/2004 |
| JP | 2005-210217 | 8/2005 |
| JP | 2005-260810 | 9/2005 |
| JP | 2009-94724 | 4/2009 |
| JP | 2010-154052 | 7/2010 |
| JP | 2010-157850 | 7/2010 |
| JP | 2010-157851 | 7/2010 |
| JP | 2010-206643 | 9/2010 |
| JP | 2010-252186 | 11/2010 |
| JP | 2011-166756 | 8/2011 |
| JP | 2012-29033 | 2/2012 |

* cited by examiner

TERMINAL DEVICE, IMAGE SHOOTING SYSTEM AND IMAGE SHOOTING METHOD

TECHNICAL FIELD

The present invention relates to a technology for stereo imaging based on the image data shot by a pair of image shooting devices.

BACKGROUND ART

As a stereoscopic shooting apparatus for stereo imaging, a pair of image shooting devices fixed to a single frame has been well known. In this stereoscopic shooting apparatus, one image shooting device shoots an image for the left eye while the other shoots an image for the right eye. These left-eye and right-eye images are combined to obtain a stereo image.

There is another stereoscopic shooting apparatus that can produce a stereo image using only one image shooting device. In this stereoscopic shooting apparatus, the image shooting device shoots a left-eye image first, then shoots a right-eye image after shifting itself to the right-eye position, and combine the left-eye image and the right-eye image being currently taken to create a stereo image. Since the right-eye image is taken while adjusting the position of the right-eye image relative to the left-eye image, an improved stereoscopic effect can be obtained.

However, both of the above stereoscopic shooting apparatuses are awkward to use. Thus, efforts have been made of find a simple technique in which a stereo image is produced by enabling two operators to operate the two image shooting devices separately and shoot a subject at the same time. As an example of a camera system based on such a technique, there is a disclosure in JP2010-157850A (Patent Document 1).

The camera system described in Patent Document 1 includes the first and second cameras that can communicate with each other. The first camera includes: an image shooting unit that shoots subjects to acquire the first image; a communication unit for receiving the second image of subjects shot by the second camera; an image processing unit that separately recognizes a main subject from the first and second images and creates composition information including the main subject and the background; a determination unit that, by comparing the composition information of the first image and the composition information of the second image, determines whether a stereo image can be formed from the first and second images; and, a display unit for displaying the popropriety of stereo imaging. The determination unit determines that stereo imaging is impossible if the size of the main subject in the first image is different from the size of the main subject in the second image. Herein, the condition in which the main subject in the first image and that in the second image are equal in size, means that the angular field of the first image coincides with the angular field of the second image.

PRIOR ART DOCUMENTS

Patent Document

Patent Document 1: JP2010-157850A

SUMMARY OF THE INVENTION

Problems to be Solved by the Invention

In the camera system described in Patent Document 1, the determination unit compares the first and second images respectively shot by the first and second cameras, and determines that stereo imaging is feasible when the main subjects have the same size or when the angles of view of the two images are equal. In other words, the determination unit determines that stereo imaging is not feasible if the angular fields of the first and second images do not coincide. In this way, because in this camera system the conditions for determining the image shooting range relationship between the two cameras are limited so that the range that allows stereo image shooting is narrowed, it is thus difficult to shoot a stereo image in practice.

The object of the present invention is to solve the above problem and provide a terminal device, image shooting system and image shooting method, which widen the range in which stereo image shooting can be carried out.

Means for Solving the Problems

To achieve the above object, one aspect of the present invention provides a terminal device comprising:
an image shooting means;
a communication means that receives a first image of a first angular field from an external terminal device; and
a determination means that determines an image shooting range relationship between the first image received by the communication means and a second image of a second angular field shot by the image shooting means, wherein the second angular field is wider than the first angular field.

Another aspect of the present invention provides an image shooting system comprising:
a first image shooting device; and
a second image shooting device that can communicate with the first image shooting device,
wherein the first image shooting device includes:
a first image shooting means; and
a first communication means that transmits a first image of a first angular field that is shot by the first image shooting means, and
wherein the second image shooting device includes:
a second image shooting means;
a second communication means that receives the first image from the first communication means; and
a determination means that determines an image shooting range relationship between the first image received by the second communication means and a second image of a second angular field that is shot by the second image shooting means, the second angular field being wider than the first angular field.

Still another aspect of the present invention provides an image shooting method comprising:
receiving a first image of a first angular field from an external terminal device; and
determining an image shooting range relationship between the received first image and a second image of a second angular field that is shot by an image shooting means, the second angular field being wider than the first angular field.

Yet another aspect of the present invention provides an image shooting method comprising:
a first image shooting device that includes a first image shooting means transmitting, to a second image shooting device that includes a second image shooting means, a first image of a first angular field that is shot by the first image shooting means; and
the second image shooting device determining an image shooting range relationship between the first image that is received from the first image shooting device and a second image of a second angular field that is shot by the second image shooting means, the second angular field being wider than the first angular field.

According to the present invention, it is possible to widen the range in which stereo image shooting can be done, thus easily perform stereo image shooting.

MODE FOR CARRYING OUT THE INVENTION

Next, the exemplary embodiments of the present invention will be described with reference to the drawings.

Figure 1:
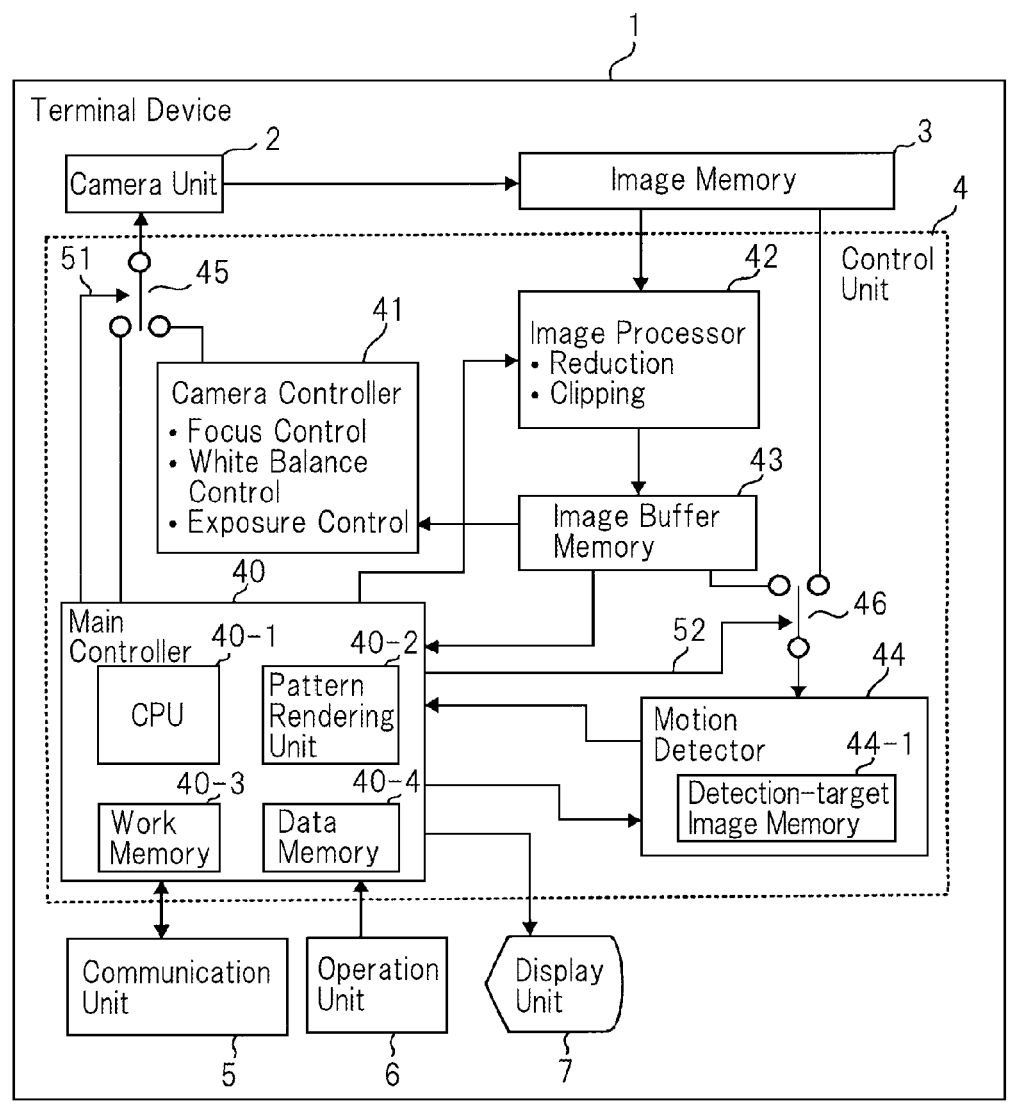
FIG. 1 A block diagram showing a configuration of a terminal device in accordance with the first exemplary embodiment of the present invention.

FIG. 1 shows a terminal device in accordance with the first exemplary embodiment. Terminal device 1 shown in FIG. 1 is used in an image shooting system capable of shooting stereo images, including camera unit 2, image memory 3, control unit 4, communication unit 5, operation unit 6 and display unit 7.

Operation unit 6 is configured of a plurality of operation buttons, a touch panel and other input means and supplies signals in accordance with user's input operations to CPU 1. Examples of the operation buttons include a shutter button, setting buttons for setting main device mode and sub device mode, and setting buttons for setting high-speed shooting mode and high-quality shooting mode.

Communication unit 5 includes an inter-device communication means for exchanging data with another terminal device. The inter-device communication means may be a wireless communication means represented by Bluetooth (registered trademark) for instance. As another inter-device communication means, a communication means using infrared (IR) communication may also be used. Communication unit 5 may also include an additional communication means for making access to networks represented by the Internet, in addition to the inter-device communication means. The additional communication means may be a communication means using wireless LAN (Local Area Network). This additional communication means may be used to download necessary programs and data.

Display unit 7 is configured of a display device such as an LDC (Liquid Crystal Display).

Camera unit 2 includes an image sensor represented by CCD (Charge Coupled Device) image sensors and CMOS (Complementary Metal-Oxide-Semiconductor) image sensors, and outputs image signals obtained via the image sensor in accordance with the instructions from control unit 4. Camera unit 2 also performs focus adjustment, white balance control and exposure control in accordance with the instructions from control unit 4.

Image memory 3 holds the image signals from camera unit 2 as image data. For example, image memory 3 holds the image data from camera unit 2 in frames. The image data stored in image memory 3 may be either still-image data or movie data.

Control unit 4 includes main controller 40, camera controller 41, image processor 42, image buffer memory 43, motion detector 44 and switches 45 and 46.

Switch 45 has an output terminal, first and second input terminals, and selects one from the first and second input terminals in accordance with selection signal 51 from main controller 40. The output terminal is connected to camera unit 2. The first input terminal is connected to main controller 40 and the second input terminal is connected to camera controller 41.

Switch 46 has an output terminal, first and second input terminals, and selects one from the first and second input terminals in accordance with selection signal 52 from main controller 40. The output terminal is connected to motion detector 44. The first input terminal is connected to image memory 3. The second input terminal is connected to image buffer memory 43.

Image processor 42 operates when one frame of image data has been accumulated in image memory 3. Image processor 42 reads out image data from image memory 3 and performs a reduction process or image clipping process on the read image data. In the reduction process, a reduced image of the image that has been stored in image memory 3 is obtained. In the image clipping process, an image with a predetermined angular field is obtained from the stored image in image memory 3. The predetermined angular field is smaller than the angular field of the unprocessed image that has been stored in image memory 3. Image processor 42 stores the image data of the reduced image or the image with a predetermined angular field into image buffer memory 43.

Here, the data size of the reduced image is smaller than the unprocessed image that has been stored in image memory 3. The data size mentioned herein is assumed to be represented by the number of pixels. The data size of the image with a predetermined angular field is smaller than that of the unprocessed image stored in image memory 3, but should be larger than a certain level that can keep the quality of image in stereo imaging. In other words, the number of pixels, in particular, valid pixels, of the image sensor of camera unit 2 should be such that the quality of the image with a predetermined angle at a certain level or higher can be maintained.

Camera controller 41 performs control of camera unit 2, for example, focus adjustment, white balance control and exposure control. Camera controller 41 has preset initial control values as its control values when camera unit 2 is activated, and performs focus adjustment, white balance control and exposure control of camera unit 2 based on the control values. Thereafter, camera controller 41 calculates each control value, based on the image data stored in image buffer memory 43, and automatically performs focus adjustment, white balance control and exposure control of camera unit 2, based on the calculated control values.

For controlling camera unit 2, well-known technologies in the field of camera engineering, for example autofocus technology, auto white-balance technology, auto exposure control technology can be used. As autofocus technology, a technique based on phase difference detection, a technique of distance measurement based on contrast detection and others can be used.

Main controller 40 is connected to switches 45, 46, image processor 42, image buffer memory 43, motion detector 44, communication unit 5, operation unit 6 and display unit 7. Main controller 40 operates in accordance with the program and controls the operation of each component in accordance with the signals from operation unit 6. Specifically, main controller 40 includes CPU (Central Processing Unit) 40-1, pattern rendering unit 40-2, work memory 40-3 and data memory 40-4.

Work memory 40-3 and data memory 40-4 are storage devices comprised of semiconductor memories and others. Work memory 40-3 holds part of programs executed by CPU 40-1 and data required when the program is executed. Data memory 40-4 holds data and image files required for pattern rendering by pattern rendering unit 40-2. Work memory 40-3 and data memory 40-4 may be formed of a single storage device. In this case, the storage device includes the storage area for work memory 40-3 and the storage area for data memory 40-4.

When the main device mode setup button in operation unit 6 is pressed down, CPU 40-1 controls switches 45 and 46 by selection signals 51 and 52 so as to cause camera controller 41 to control camera unit 2 and so as not to allow operation of motion detector 44. When the sub device mode setup button in operation unit 6 is pressed down, CPU 40-1 controls switches 45 and 46 by selection signals 51 and 52 so as to cause motion detector 44 to operate and so as not to allow operation of camera controller 41.

Figure 2:
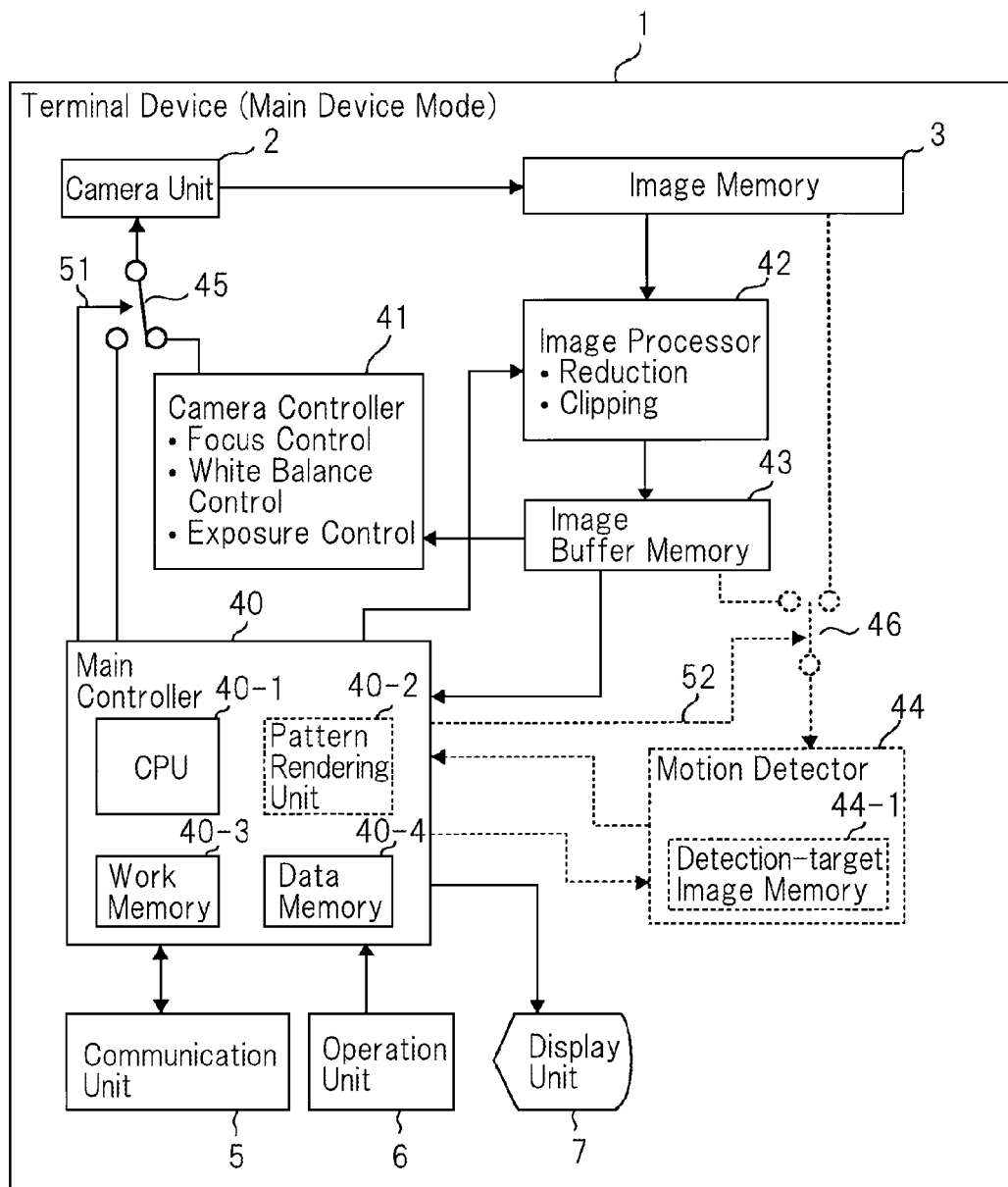
FIG. 2 A schematic diagram showing the operating state of the terminal device shown in FIG. 1 when main device mode is set up.

FIG. 2 is a schematic diagram showing the operating state of terminal device 1 when terminal device 1 is set up in the main device mode. In FIG. 2, of the blocks of terminal device 1, the blocks shown with solid lines are effective blocks that operate in the main device mode and the blocks shown with broken lines do not operate in the main device mode.

As shown in FIG. 2, in terminal device 1 in the main device mode, camera unit 2, image memory 3, communication unit 5, operation unit 6, display unit 7, CPU 40-1, work memory 40-3, data memory 40-4, camera controller 41, image processor 42, and image buffer memory 43 operate while motion detector 44 does not operate. Pattern rendering unit 40-2 does not normally operate but becomes active only when receiving a particular notice from terminal device 1B set in the sub device mode (see FIG. 4).

In the main device mode, image processor 42 performs a clipping process. In the clipping process, the central part of the image stored in image memory 3 is invariably cut out. The thus clipped image has a predetermined angular field and is stored into image buffer memory 43.

Camera controller 41, based on the image data of a predetermined angular field stored in image buffer memory 43, performs focus adjustment, white balance control and exposure control of camera unit 2. Specifically, in each of focus adjustment, white balance control and exposure control, camera controller 41 calculates control values based on the image data of a predetermined angular field and controls the operation of camera unit 2 based on the control values.

CPU 40-1 acquires the control values for focus adjustment, white balance control and exposure control from camera controller 41, and transmits the acquired control values from communication unit 5 to the terminal device that is set up in the sub device mode. CPU 40-1 may also transmit the content in image buffer memory 43 and an image shoot executing command for execution from communication unit 5 to the terminal device in the sub device mode and may receive notices regarding the image from the terminal device in the sub device mode via communication unit 5. As described above, the content of image buffer memory 43 herein is image data of a predetermined angular field.

Figure 3:
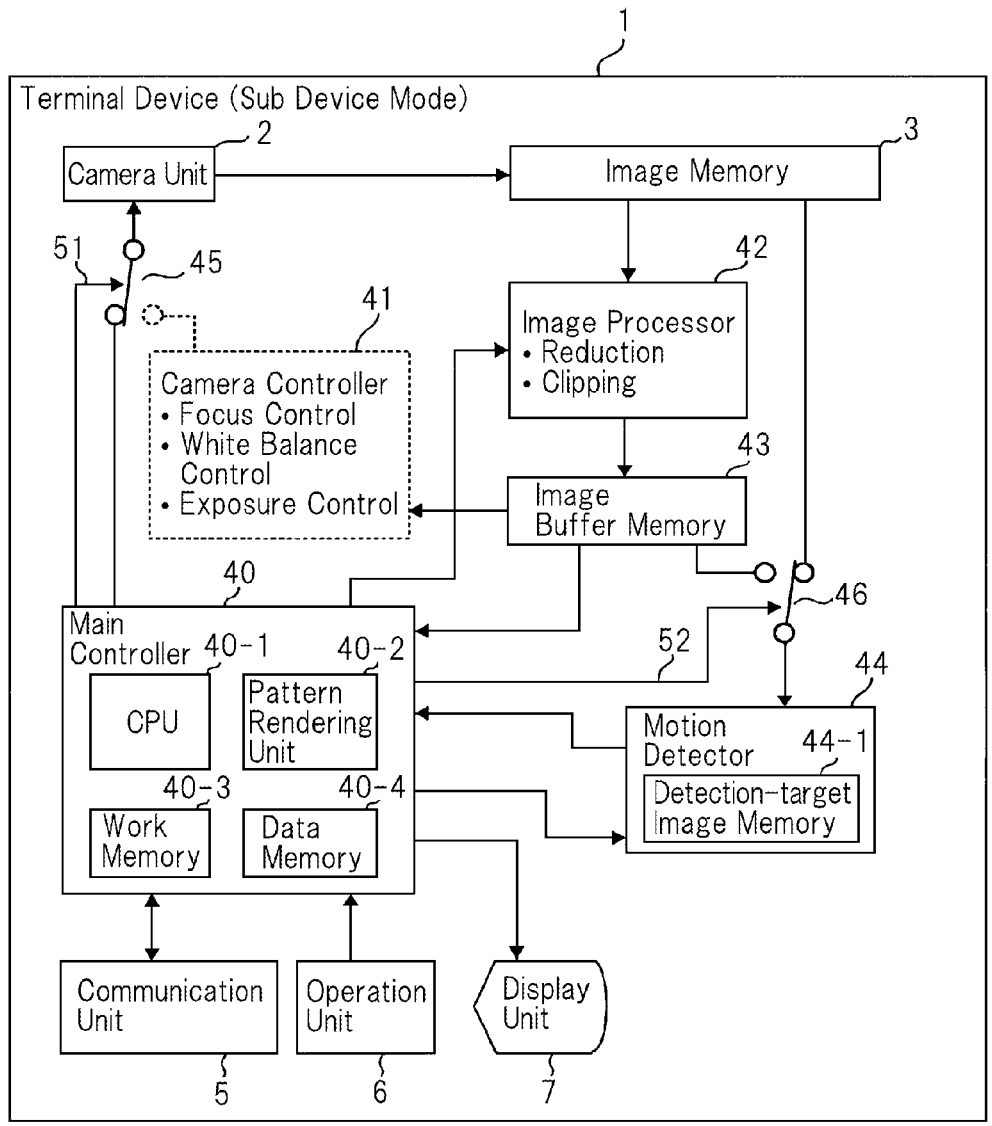
FIG. 3 A schematic diagram showing the operating state of the terminal device shown in FIG. 1 when sub device mode is set up.

On the other hand, FIG. 3 is a schematic diagram showing the operating state of terminal device 1 when the terminal device 1 is set up in the sub device mode. In FIG. 3, of the blocks of terminal device 1, the blocks shown with solid lines are effective blocks that operate in the sub device mode and the blocks shown with broken lines do not operate in the sub device mode.

As shown in FIG. 3, in terminal device 1 in the sub device mode, camera unit 2, image memory 3, communication unit 5, operation unit 6, display unit 7, CPU 40-1, pattern rendering unit 40-2, work memory 40-3, data memory 40-4, image processor 42, image buffer memory 43, and motion detector 44 operates while camera controller 41 does not operate.

In sub move, camera controller 41 is in a suspended state while CPU 40-1 receives control values for focus adjustment, white balance control and exposure control from the terminal device in the main device mode via communication unit 5, and controls camera unit 2 based on the received control values. CPU 40-1 also receives image data of a predetermined angular field from the terminal device in the main device mode via communication unit 5 and supplies the received image data to motion detector 44. CPU 40-1 further transmits the notices about the image from communication unit 5 to the terminal device in the main device mode.

Further, in the sub device mode, image processor 42 performs a reduction process in the normal condition, and stores the reduced image data of the entire image stored in image memory 3 into image buffer memory 43. CPU 40-1 then displays the reduced image data stored in image buffer memory 43 on display unit 7.

Motion detector 44 includes detection-target image memory 44-1. In the sub device mode, detection-target image memory 44-1 holds the image data of a predetermined angular field supplied from CPU 40-1.

Further, motion detector 44 determines the relationship between the image shooting range of the image data stored in image memory 3, i.e., the image data that has experienced a reduction process or a clipping process and the image shooting range of the image data of a predetermined angular field stored in detection-target image memory 44-1. In this determination, for example, motion detector 44 detects an image area corresponding to the image of a predetermined angular field, from the image stored in image memory 3, and detects the coordinates of the detected image area on image memory 3. The coordinates on image memory 3 directly show the position or place in the image. Further, motion detector 44, based on the detected coordinates, or positional information, determines the image shooting range relationship. Motion detector 44 may be configured by converting a circuit that is generally used in movie compression. In sum, CPU 40-1 and motion detector 44 provide a function of a determination unit or determination means for determining the image shooting range relationship between the first image received by communication unit 5 and the second image of a second angular field that is wider than the first angular field, shot by camera unit 2. It is also possible to form a determination unit by dedicated hardware without using CPU 40-1.

In the above detection process of the image area corresponding to the image of a predetermined angular field, widely known techniques in the technical fields of movie compression and image recognition, for instance, a pattern matching process, a process of detecting areas where the degree of similarity representing how similar the image data is, is equal to or greater than a predetermined level, and other image processing techniques, can be used.

Further, in the sub device mode, CPU 40-1 acquires from motion detector 44 the positional information of the image area corresponding to the image of a predetermined angular field, in the image stored in image memory 3, and supplies the acquired positional information to pattern rendering unit 40-2. Pattern rendering unit 40-2, based on the positional information from CPU 40-1, renders a rectangular pattern to graphically represent the position of the image area corresponding to the image of a predetermined angular field, on the image stored in image memory 3, and superposes the rendered rectangular pattern on the image in image buffer memory 43.

Further, in the sub device mode, CPU 40-1 is able to receive an image shooting command from the terminal device in the main device mode via communication unit 5. CPU 40-1, following the received image shooting command, sets the clipping range for image processor 42, in the positional information detected by motion detector 44, or in the coordinates in image memory 3. Image processor 42 cuts out, from image memory 3, the image of the same image shooting range with that of the terminal device in the main device mode and stores the clipped image into image buffer memory 43. Then, CPU 40-1 causes communication unit 5 to transmit the content of image buffer memory 43 as the shot image data to the terminal device in the main device mode.

Next, the operation of the image shooting system of the present exemplary embodiment will be described.

The image shooting system of the present exemplary embodiment includes a plurality of terminal devices, each device including the configuration shown in FIG. 1.

Figure 4:
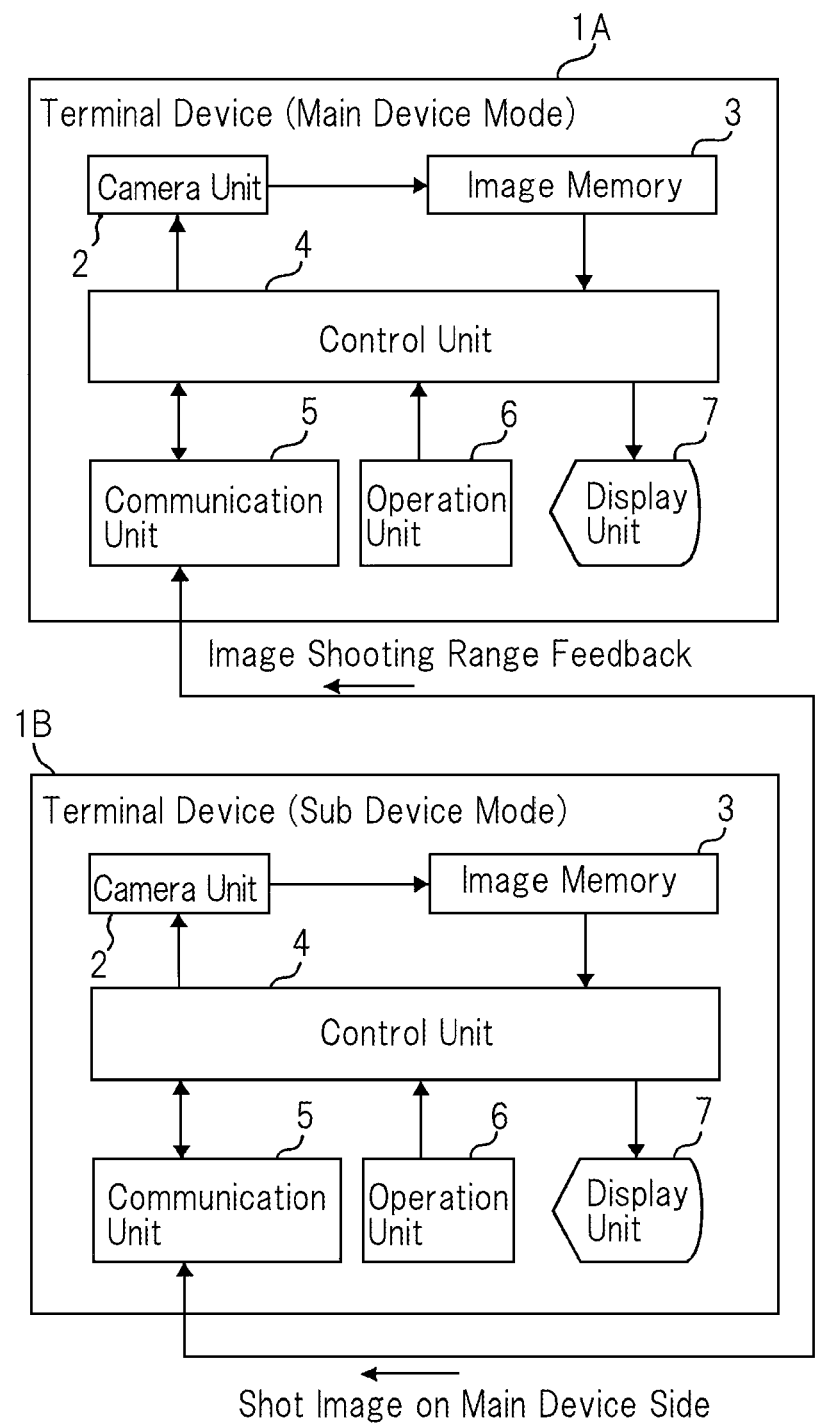
FIG. 4 A block diagram showing a configuration of an image shooting system using the terminal devices shown in FIG. 1.

FIG. 4 shows a system including two terminal devices, where one terminal device is set in the main device mode or operates as the main device and the other is set in the sub device mode or operates as the sub device.

In the form shown in FIG. 4, the image shooting system includes two terminal devices 1A and 1B. Terminal devices 1A and 1B each have the configuration shown in FIG. 1. The main device mode setup button is pressed down in operation unit 6 of terminal device 1A so that terminal device 1A operates as the main device. Accordingly, terminal device 1A is in the state shown in FIG. 2. The sub device mode setup button is pressed down in operation unit 6 of terminal device 1B so that terminal device 1B operates as the sub device. Accordingly, terminal device 1B is in the state shown in FIG. 3.

Terminal devices 1A and 1B are controlled by different users. Herein, user A operates terminal device 1A and user B operates terminal device 1B. Either of terminal devices 1A and 1B is used as the right-eye image shooting device while the other is used as the left-eye image shooting device.

Users A and B arrange terminal devices 1A and 1B at an appropriate interval and operate terminal devices 1A and 1B jointly to shot a subject. A stereo image can be obtained by this operation. For example, when terminal devices 1A and 1B are arranged at a predetermined interval to form a suitable parallax, it is possible to shoot a stereo image presenting a natural feeling of perspective. When terminal devices 1A and 1B are deployed more apart from each other than a predetermined interval, it is even possible to shoot an image of a plurality of subjects that are distant from each other with an emphasized feeling of perspective.

Figure 5:
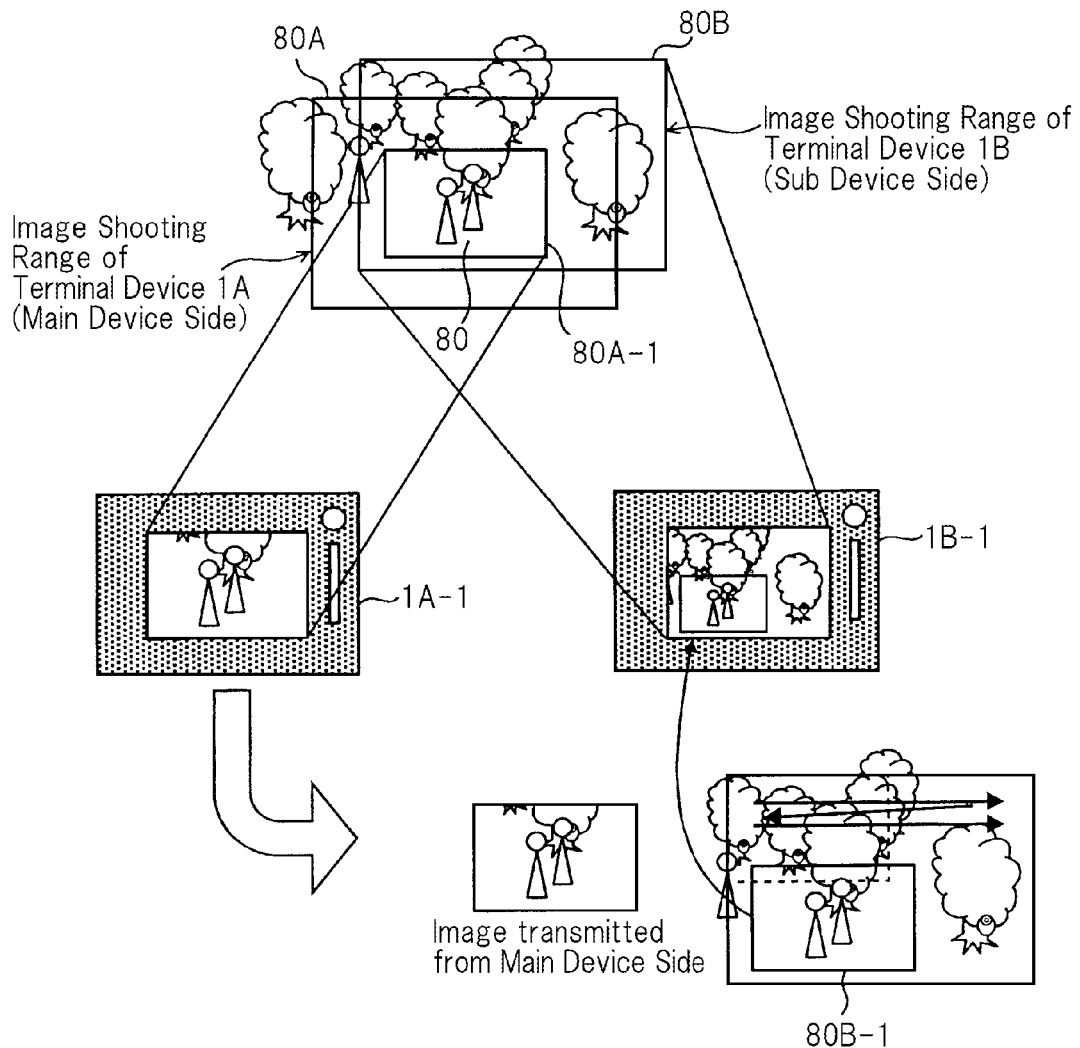
FIG. 5 A schematic diagram showing a screen display example in an image shooting operation based on the linkage between terminal devices in the image shooting system shown in FIG. 4.

FIG. 5 is a schematic diagram showing a screen display example in an image shooting operation where terminal device 1A in the main device mode and terminal device 1B in the sub device mode are linked with each other.

As shown in FIG. 5, in terminal device 1A in the main device mode, image memory 3 holds image 80A of subject 80 shot by camera unit 2, image processor 42 cuts out the central part of image 80A and stores the clipped image as image 80A-1 of a predetermined angular field, into image buffer memory 43. Then, CPU 40-1 displays image 80A-1 stored in image buffer memory 43 on screen 1A-1 of display unit 7, and causes communication unit 7 to transmit image 80A-1 to terminal device 1B in the sub device mode.

On the other hand, in terminal device 1B in the sub device mode, image memory 3 holds image 80B of subject 80 shot by camera unit 2, image processor 42 stores a reduced image of image 80B into image buffer memory 43. Then, CPU 40-1 causes display unit 7 to display the reduced image of image 80B stored in image buffer memory 43 on screen 1B-1. Herein, the image shooting range of image 80B is slightly displaced from the image shooting range of image 80A. The angular field of image 80B is wider than the angular field of image 80A-1.

Also, in terminal device 1B in the sub device mode, detection-target image memory 44-1 holds image 80A-1 of a predetermined angular field, transmitted from terminal device 1A. Motion detector 44 compares unreduced image 80B stored in image memory 3 with image 80A-1 stored in detection-target image memory 44-1, so as to detect an image area corresponding to image 80A-1, from image 80B, and detects the coordinates of the detected image area on image memory 3. Then, image rendering unit 40-2, based on the detected coordinates, renders a rectangular image showing the image area corresponding to image 80A-1, and superposes the rectangular image 80B-1 on the reduced image of image 80B stored in image buffer memory 43. As a result, the image of the reduced image of image 80B superposed with rectangular image 80B-1 is displayed on screen 1B-1 of display unit 7. In general, the image shooting range of a camera unit is given as a rectangular area. Accordingly, the image area is represented as a rectangular area. For this, in the terminal device of the present exemplary embodiment, a rectangular image is generated as an image of the contour of the rectangular area corresponding to the image shooting range or the image area. That is, the rectangular image takes a form of a frame-like image, and when rectangular image 80B-1 is superposed on the reduced image of image 80B, the reduced image of image 80B can also be seen inside rectangular image 80B-1.

According to the above cooperative image shooting operation shown in FIG. 5, while confirming the display of screen 1A-1 of terminal unit 1A, operator A shoots subject 80 with camera unit 2 so that subject 80 is positioned in the center of the screen. On the other hand, in terminal device 1B, rectangular image 80B-1 that is displayed on screen 1B-1 indicates the central part of the image shooting range of camera unit 2 of terminal device 1A. Thereby, operator B, based on rectangular image 80B-1 displayed on screen 1B-1, can confirm the relationship between the image shooting range of camera unit 2 of terminal device 1B and the image shooting range of camera unit 2 of terminal device 1A. Further, operator B, by changing the orientation of camera unit 2 while confirming the displayed position of rectangular image 80B-1, can keep the image shooting range of camera unit 2 of terminal device 1B in a desirable relationship with the image shooting range of camera unit 2 of terminal device 1A.

For example, in the example shown in FIG. 5, rectangular image 80B-1 is located in the lower left side on screen 1B-1. Operator B moves camera unit 2 downward and leftward, rectangular image 80B-1 moves toward the center of the screen. As the direction of camera unit 2 is changed so as to position rectangular image 80B-1 in the center of the screen, subject 80 comes to be positioned in the respective center of the image shooting range of camera unit 2 of terminal device 1B and the image shooting range of camera unit 2 of terminal device 1A. As a result, it is possible to maintain the image shooting range of camera unit 2 of terminal device 1B and the image shooting range of camera unit 2 of terminal device 1A in such a suitable relationship to form a stereo image.

Herein, there occur cases where the image shooting range of camera unit 2 of terminal device 1A greatly deviates from the image shooting range of camera unit 2 of terminal device 1B if subject 80 moves fast. In the present exemplary embodiment, in terminal device 1B, motion detector 44 detects the image area corresponding to image 80A-1 transmitted from terminal device 1A, from unreduced image 80B stored in image memory 3, and detects the coordinates of the detected image area on image memory 3. Then, CPU 40-1, based on the detected coordinates, determines the relationship between the image shooting range of camera unit 2 of terminal device 1A and the image shooting range of camera unit 2 of terminal device 1B, and gives a notice depending on the determination result to terminal device 1A.

In the above determination, CPU 40-1 performs the first determination as to whether the image area corresponding to image 80A-1 is located in the peripheral part of image 80B and the second determination as to whether the image area corresponding to image 80A-1 is located in the central part of image 80B.

Figure 6:
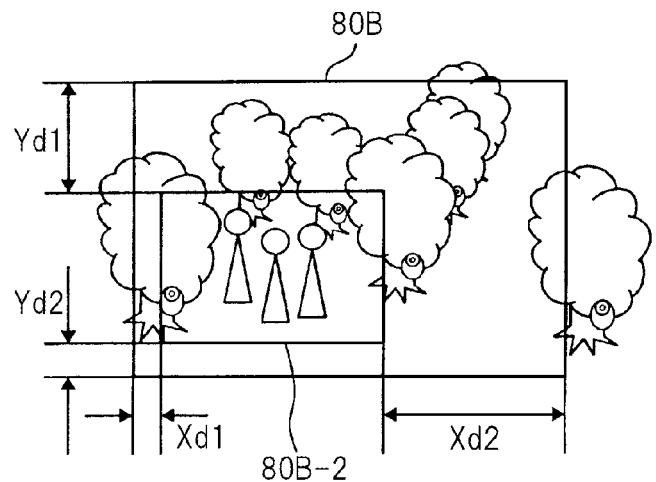
FIG. 6 A schematic diagram for illustrating an image clipping operation in the terminal device in sub device mode in the image shooting system shown in FIG. 4.

FIG. 6 shows one example showing the coordinates of the image area corresponding to image 80A-1 on image 80B. In the example shown in FIG. 6, image area 80B-2 is the image area corresponding to image 80A-1 transmitted from terminal device 1A, in unreduced image 80B stored in image memory 3. The distance between the upper end of image 80B and the upper end of image area 80B-2 is represented by margin Yd1, the distance between the lower end of image 80B and the lower end of image area 80B-2 is a represented by margin Yd2, the distance between the left end of image 80B and the left end of image area 80B-2 is represented by margin Xd1, and the distance between the right end of image 80B and the right end of image area 80B-2 is represented by margin Yd2.

In terminal device 1B, motion detector 44 acquires the values of margins Yd1, Yd2, Xd1, Xd2 as the coordinate information on image area 80B-2 on image 80B.

In the first determination, CPU 40-1 compares each of the values of margins Yd1, Yd2, Xd1, Xd2 with threshold T1. If any of the values of margins Yd1, Yd2, Xd1, Xd2 is smaller than threshold T1, the CPU determines that the image area corresponding to image 80A-1 is located in the peripheral part of image 80B and gives an image shooting range alert notice to terminal device 1A.

When the first determination is negative, CPU 40-1 determines in the second determination whether both the difference between margins Yd1and Yd2and the difference between Xd1 and Xd2 are smaller than threshold T2. Here, it is assumed that either of the difference between margins Yd1and Yd2and the difference between Xd1 and Xd2 is represented in absolute value. Only when both of these differences are smaller than T2, will CPU 40-1 determine that the image area corresponding to image 80A-1 is located in the center of image 80B, and provide a center notice indicating that subject 80 resides in the centers of the image shooting ranges of terminal devices 1A and 1B.

Thresholds T1 and T2 can be set arbitrarily, for example, at 10. CPU 40-1 may also have held thresholds T1 and T2 in advance. Alternatively, when the program is started, thresholds T1 and T2 may be retained in memory work 40-3.

In terminal device 1A, upon receiving the image shooting range alert notice from terminal device 1B via communication unit 5, CPU 40-1 activates pattern rendering unit 40-2 to prepare an alert image thereby. Then, CPU 40-1 causes display unit 7 to display the alert image prepared by pattern rendering unit 40-2. The alert image is, for example, a rectangular frame represented by broken lines. CPU 40-1 displays the rectangular frame over image 80A-1.

From the display of the alert image, operator A can recognize a situation in which the image shooting range of camera unit 2 of terminal device 1A largely deviates from the image shooting range of camera unit 2 of terminal device 1B.

In terminal device 1A, CPU 40-1 issues a shoot command conforming to the shooting mode. Shooting modes include high-speed shooting mode and high-quality shooting mode. Operator A can set up either the high-speed shooting mode or high-quality shooting mode through operation unit 6.

In the high-speed shooting mode, if the shutter button in operation unit 6 is pressed down, CPU 40-1 performs an image shooting process to store the image taken by camera unit 2 as an image for forming a stereo image and also issues an image shoot command and causes communication unit 5 to transmit the image shoot command to terminal device 1B.

In the high-quality shooting mode, CPU 40-1 will neither start an image shooting process for stereo image nor issue any image shoot command until it receives the center notice from terminal device 1B even if the shutter button of operation unit 6 is pressed down. When receiving the center notice from terminal device 1B, CPU 40-1 starts an image shooting process for forming stereo imaging and issues an image shoot command and causes communication unit 5 to transmit the image shoot command to terminal device 1B.

In terminal device 1B, CPU 40-1 receives the image shoot command via communication unit 5, and instructs image processor 42 to perform a clipping process in accordance with this image shoot command. Image processor 42, in accordance with the instructions from CPU 40-1, performs a clipping process. In the clipping process, the central part of the image stored in image memory 3 is invariably cut out. The thus clipped image is an image of a predetermined angular field, and is stored in image buffer memory 43.

After the clipping process, CPU 40-1 causes communication unit 5 to transmit the image data of a predetermined angular field stored in image buffer memory 43, to device terminal 1A.

In device terminal 1A, CPU 40-1 receives the image data of a predetermined angular field from device terminal 1B via communication unit 5, and creates a stereo image data based on the received image data of a predetermined angular field and the image data of a predetermined angular field stored in image buffer memory 43 and causes display unit 7 to display the stereo image based on the created stereo image data. Here, the angular field of the image from device terminal 1B approximately coincides with the angular field of the image stored in image buffer memory 43.

FIGS. 7A to 7D schematically show the change of the screen display in each of terminal devices 1A and 1B when the direction of camera unit 2 is adjusted so that rectangular image 80B-1 will be positioned in the screen center.

Figure 7A:
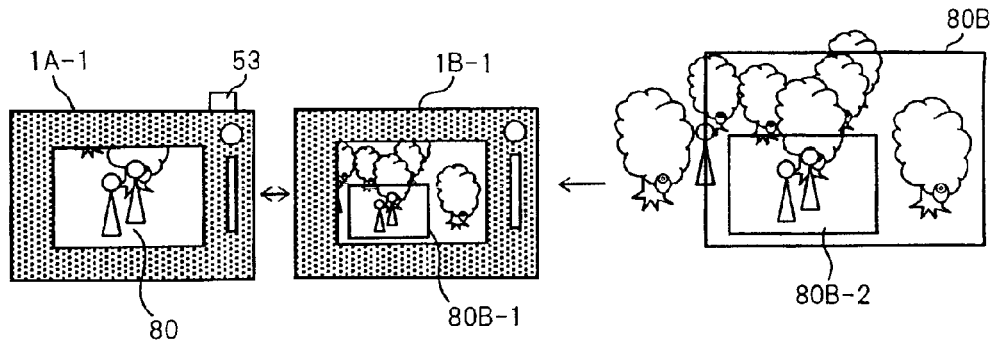
FIG. 7A A schematic diagram showing one screen display example in each terminal device in the image shooting system shown in FIG. 4.

FIG. 7A shows a state in which the operator, while tracking subject 80 of two persons by camera unit 2, is ready to press shutter button 53 when the third person enters the frame. In this state, in terminal device 1B rectangular image 80B-1 that shows the image shooting range of terminal device 1A is displayed on screen 1B-1. Though located in the lower left area on screen 1B-1, rectangular image 80B-1 is slightly off the edge of screen 1B-1.

Figure 7B:
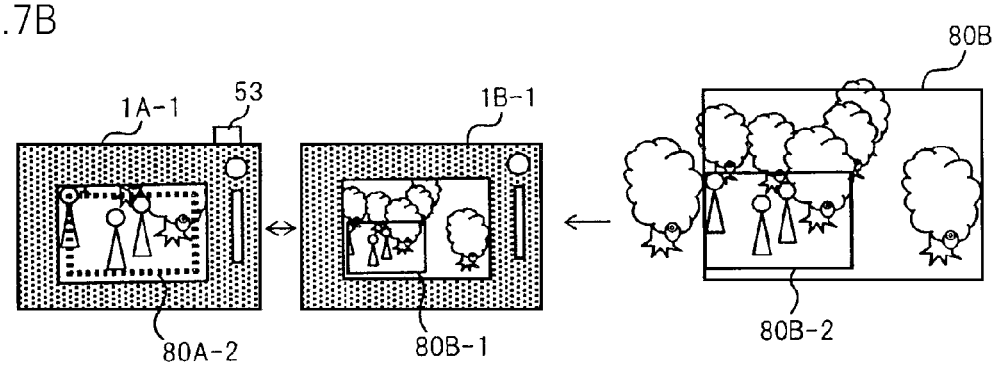
FIG. 7B A schematic diagram showing another screen display example in each terminal device in the image shooting system shown in FIG. 4.

FIG. 7B shows a state in which the operator B's action of tracking subject 80 with camera unit 2 of terminal device 1B is delayed relative to the operator A's action of tracking subject 80 with camera unit 2 of terminal device 1A. Specifically, this state indicates that rectangular image 80B-1 is located near the edge in the lower left area on screen 1B-1 so that margin Xd1 shown in FIG. 6 is smaller than threshold T2.

In the above state, in terminal device 1B, CPU 40-1 gives an image shooting range alert notice to terminal device 1A. In terminal device 1A, CPU 40-1 receives the image shooting range alert notice from terminal device 1B via communication unit 5, and causes display unit 7 to display alert image 80A-2. Alert image 80A-2 is shown as a rectangular frame, but is not limited to this. Alert image 80A-2 may be any image as long as operator A can recognize the fact of being alerted. For example, an image of a particular color, an image that periodically changes colors and luminance, an image including alert messages and others can be used as alert image 80A-2. One example of a periodically changing image is a flashing image.

After display of alert image 80A-2, if the operator A's action of tracking subject 80 with camera unit 2 of terminal device 1 becomes faster, rectangular image 80B-1 goes out of screen 1B-1, so that it becomes difficult for operator B to recognize the image shooting range of terminal device 1A. In this case, in terminal device 1B, CPU 40-1 gives an out-of-range notice to terminal device 1A. In terminal device 1A, CPU 40-1 receives the out-of-range notice from terminal device 1B via communication unit 5 and causes display unit 7 to display the image for notifying the out-of-range notice. The out-of-range notifying image may be any image as long as operator A can distinguish it from alert image 80A-2 and can recognize out-of-range notice. For example, an image of a particular color, an image that periodically changes colors and luminance, an image including an out-of-range notifying message and others can be used as the out-of-range notifying image. Also herein, the periodically changing image may be a flashing image, for instance.

After display of alert image 80A-2, if the operator A's action of tracking subject 80 with camera unit 2 of terminal device 1A slows down, soon the operator B's action of tracking subject 80 with camera unit 2 of terminal device 1B catches up with the operator A's action, and terminal device 1B stops transmission of the range alert notice. As a result, in terminal device 1A, display of alert image 80A is cancelled.

Figure 7C:
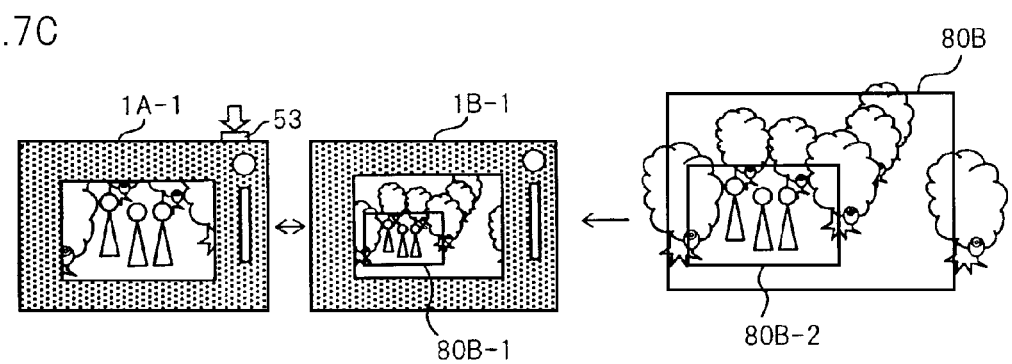
FIG. 7C A schematic diagram showing still another screen display example in each terminal device in the image shooting system shown in FIG. 4.

FIG. 7C shows a state in which operator A has pressed down shutter button 53 of operation unit 6 of terminal device 1A because a desired photo scene has been obtained. Terminal device 1B neither issues any image shooting range alert notice nor out-of-range notice since rectangular image 80B-1 is fitted within image 1B-1. However, rectangular image 80B-1 is not located in the center of the screen, so that no center notice has yet been given to terminal device 1A.

In the above state, if terminal device 1A is set in the high-speed shooting mode, in terminal device 1A, CPU 40-1 immediately performs an image shooting process for stereo imaging and transmits an image shooting command to terminal device 1B because terminal device 1A has received neither image shooting range alert notice nor out-of-range notice. In terminal device 1B, CPU 40-1 performs an image shooting process for stereo imaging in accordance with the image shooting command from terminal device 1A.

Figure 7D:
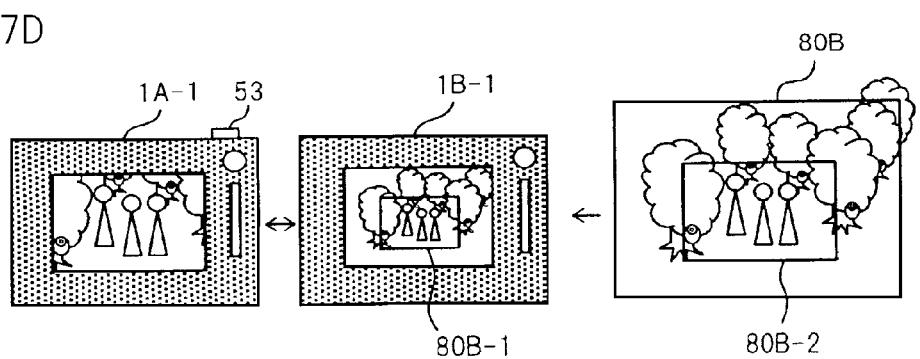
FIG. 7D A schematic diagram showing yet another example screen display in each terminal device in the image shooting system shown in FIG. 4.

If terminal device 1A is set in the high-quality shooting mode, in terminal device 1A, CPU 40-1 waits for a center notice from terminal device 1B. FIG. 7D shows a state in which rectangular image 80B-1 is positioned in the center of the screen as a result of operator B's changing the direction of the camera unit of terminal device 1B.

In the above state, in terminal device 1B, CPU 40-1 gives a center notice to terminal device 1A. In terminal device 1A, CPU 40-1 performs an image shooting process for stereo imaging at the timing at which the center notice is received from terminal device 1B and issues an image shoot command to terminal device 1B. In terminal device 1B, CPU 40-1 performs an image shooting process for stereo imaging in accordance with the image shoot command from terminal device 1A.

Next, the operation of each terminal device in the image shooting system shown in FIG. 4 will be described.

To begin with, the camera activating process of each of terminal devices 1A, 1B will be described.

Figure 8:
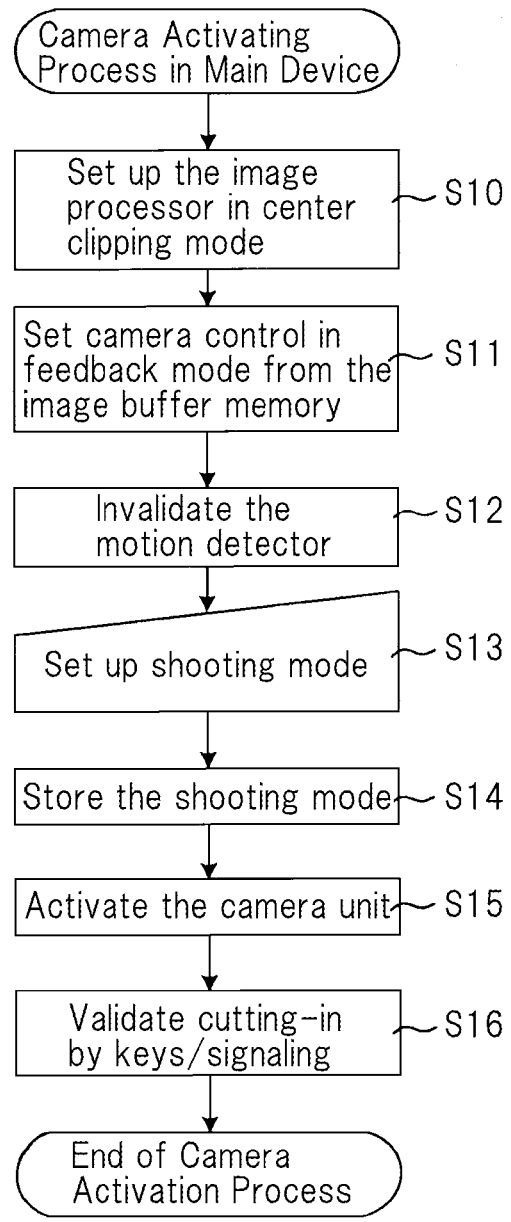
FIG. 8 A flow chart for illustrating a procedural sequence of the camera activating process in the terminal device in main device mode.

FIG. 8 shows the sequential steps of the camera activating process in terminal device 1A in the main device mode. In this sequence, CPU 40-1 first sets image processor 42 so as to perform a center clipping operation at Step S10. Then, CPU 40-1 configures camera controller 41 so as to control camera unit 2 at Step S11, and invalidates motion detector 44 at Step S12. Next, CPU 40-1 receives input of setting up a shooting mode via operation unit 6 at Step S13, and stores the information on the set shooting mode, i.e., the set value of shooting mode, into work memory 40-3, at Step S14. Finally, CPU 40-1 activates camera unit 2 at Step S15, and validates cut-in operations based on information input through control unit 6 and communication unit 5 at Step S16.

Figure 9:
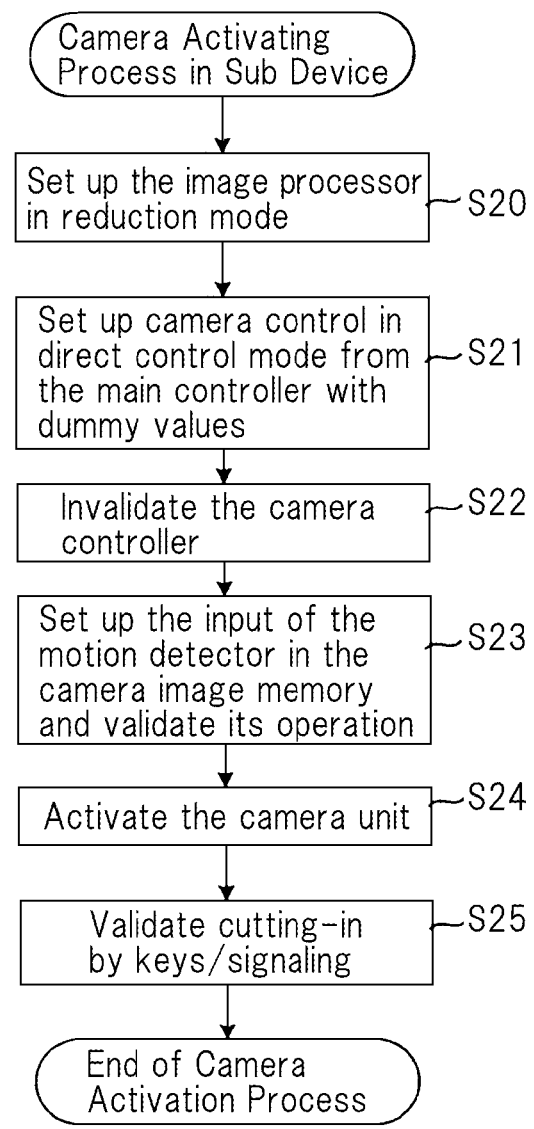
FIG. 9 A flow chart for illustrating a procedural sequence of the camera activating process in the terminal device in sub device mode.

FIG. 9 shows the sequential steps of the camera activating process in terminal device 1B in the sub device mode. In the sequence shown in FIG. 9, CPU 40-1 first sets image processor 42 so as to perform a reduction process at Step S20. Then, CPU 40-1 configures so that camera unit 2 is directly controlled from CPU 40-1 and sets up dummy control values at Step S21. Further, CPU 40-1 invalidates camera controller 41 at Step S22. Next, at Step S23, CPU 40-1 sets up the input of motion detector 44 in image memory 3 and validates motion detector 44. Finally, CPU 40-1 activates camera unit 2 at Step S24, and validates cut-in operations based on information input through control unit 6 and communication unit 5 at Step S25.

Next, the standing-state process in each of terminal devices 1A, 1B will be described.

Figure 10:
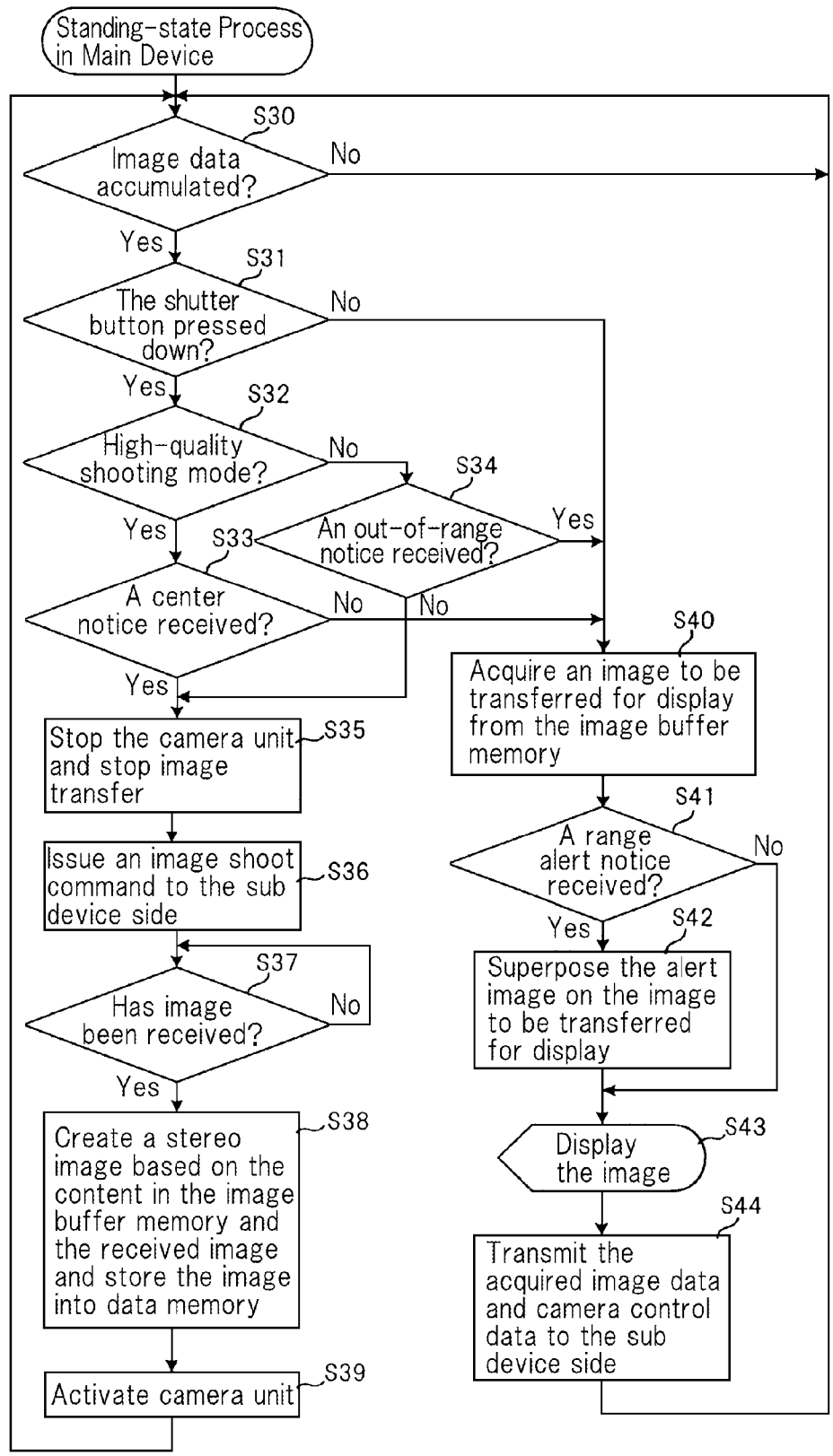
FIG. 10 A flow chart for illustrating a procedural sequence of a standing-state process in the terminal device in main device mode.

FIG. 10 shows a procedural sequence of the standing-state process in terminal device 1A in the main device mode. The standing-state process herein means performing a process when the shutter button is pressed and/or when a notice is given from terminal device 1B in the sub device mode while displaying the central part of the image taken by camera unit 2 on the screen.

First, CPU 40-1 determines whether image data has been accumulated from camera unit 2 into image memory 3, at Step S30. If the determination result at Step S30 is "No", CPU 40-1 repeats Step S30 to wait for accumulation of image data. When the determination result at Step S30 is "Yes", then CPU 40-1 determines whether the shutter button has been pressed down, at Step S31.

When the determination result at Step S31 is "Yes", CPU 40-1 determines whether the set shooting mode is the high-quality shooting mode, at Step S32. This determination of shooting mode is performed based on the set value of the shooting mode stored in work memory 40-3 at the time when the camera is activated.

When the determination result at Step S32 is "Yes", CPU 40-1 determines whether a center notice has been received from terminal device 1B, at Step S33. On the other hand, if the determination result at Step S32 is "No", CPU 40-1 determines whether an out-of-range notice has been received from terminal device 1B, at Step S34.

When the determination result at Step S33 is "Yes" or when the determination result at Step S34 is "No", CPU 40-1 stops camera unit 2 and stops writing image data into image memory 3, at Step S35. After execution of Step S35, CPU 40-1 issues an image shooting command to terminal device 1B at Step S36 and determines at Step S37 whether an image from terminal device 1B has been received. When the determination result at Step S37 is "No", CPU 40-1 repeats Step S37 to wait for reception of an image. When the determination result at Step S37 is "Yes", CPU 40-1 creates image data for stereo imaging, based on the image data stored in image buffer memory 43 and the image data received from terminal device 1B, and stores the resultant image data into data memory 40-4, at Step S38. After execution of Step S38, CPU 40-1 activates camera unit 2 at Step S39. After activation of camera unit 2, CPU 40-1 returns to Step S30 and executes the process from Step S30.

When the determination result at Step S31 is "No", when the determination result at Step S33 is "No", or when the determination result at Step S34 is "Yes", CPU 40-1 acquires the image to be transferred for display from image buffer memory 43 at Step S40, and determines whether any range alert notice has been received from terminal device 1B, at Step S41. When the determination result at Step S41 is "Yes", CPU 40-1 superposes the alert image on the image to be transferred for display, at Step S42, then displays the resultant image obtained by superposing the alert image on the image to be transferred for display, on display unit 7, at Step S43. On the other hand, if the determination result at Step S41 is "No", CPU 40-1 displays the image to be transferred for display as is, on display unit 7, at Step S43.

After Step S43, CPU 40-1 causes communication unit 5 to transmit the image data acquired from image buffer memory 43 and control data for controlling camera unit 2, to terminal device 1B. Herein, the control data includes control values for focus adjustment, white balance control and exposure control.

After execution of Step S44, CPU 40-1 returns to Step S30 and repeats the process from Step S30.

Figure 11:
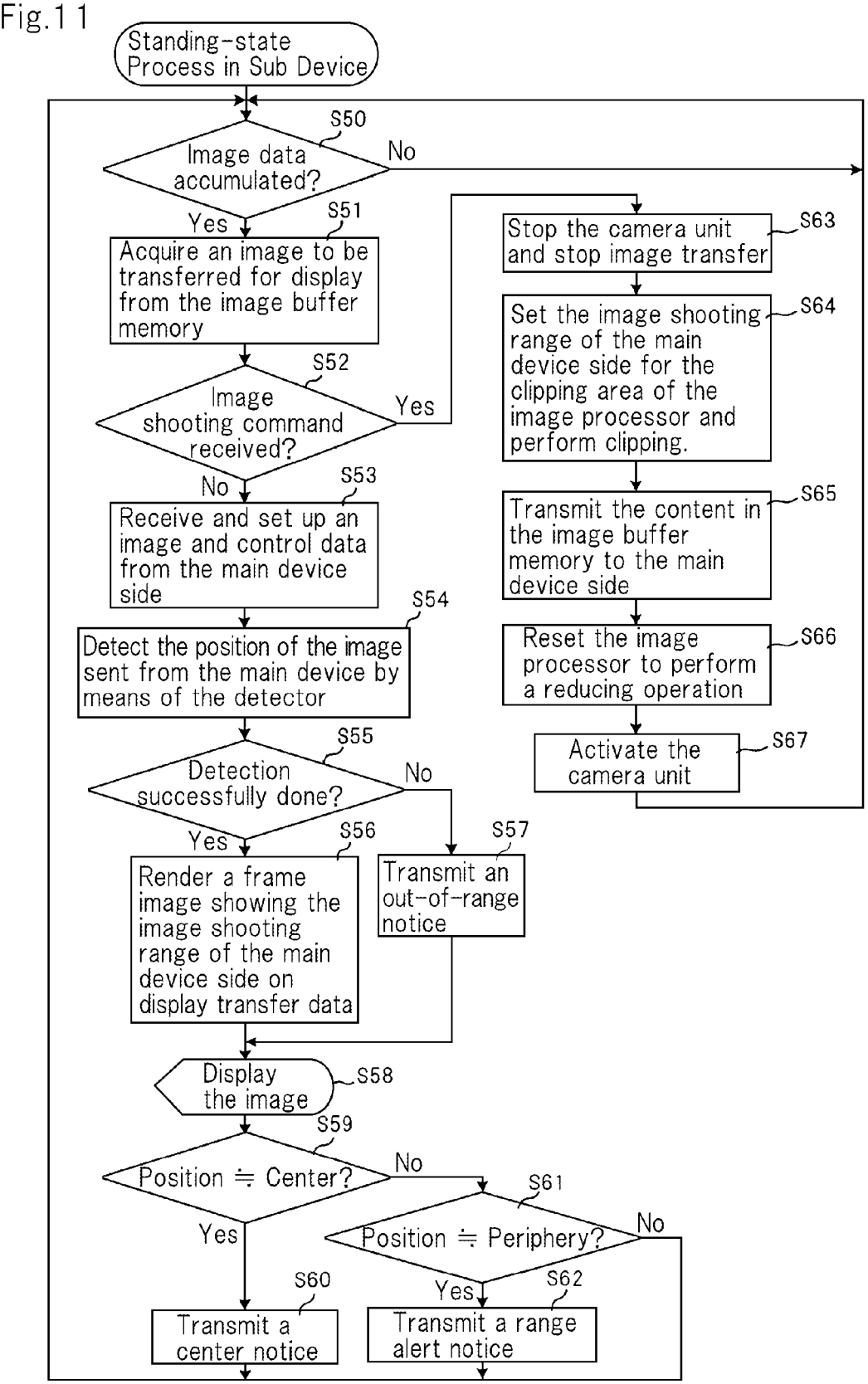
FIG. 11 A flow chart for illustrating a procedural sequence of a standing-state process in the terminal device in sub device mode.

FIG. 11 shows a procedural sequence of the standing-state process in terminal device 1B in the sub device mode. The standing-state process herein means performing a notifying process based on the image shooting range relationship between terminal devices 1A and 1B and an image shooting process in accordance with the image shoot command from terminal device 1A, while displaying the image taken by camera unit 2 with the rectangular image that indicates the image shot area of terminal device 1A, on the screen.

First, CPU 40-1 determines whether image data has been accumulated from camera unit 2 into image memory 3, at Step S50. If the determination result at Step S50 is "No", CPU 40-1 repeats Step S50 to wait for accumulation of image data. When the determination result at Step S50 is "Yes", then CPU 40-1 acquires the image to be transferred for display from image buffer memory 43 at Step 51, and determines whether an image shoot command has been received from terminal device 1A, at Step S52.

When the determination result at Step S52 is "No", CPU 40-1 sets up camera unit 2 based on the control data received from terminal device 1A, at Step S53, then motion detector 44-1 detects the position of the area corresponding to the image of a predetermined angular field sent from terminal device 1A, on the image stored in image memory 3, at Step S5. Thereafter, CPU 40-1 determines whether detection by motion detector 44-1 has been successfully done, at Step S55.

When the determination result at Step S55 is "Yes", CPU 40-1 superposes the rectangular image showing the image shooting range of terminal device 1A obtained based on the detection result from motion detector 44-1, on the image to be transferred for display, at Step S56, then displays the obtained image with the rectangular image superposed on the image to be transferred for display, on display unit 7, at Step S58. On the other hand, when the determination result at Step S55 is "No", CPU 40-1 gives an out-of-range notice to terminal device 1A at Step S57 and causes display unit 7 to display the image to be transferred for display, at Step S58.

After the image displaying process at Step S58, CPU 40-1 determines whether the rectangular image is located in the center of the screen based on the result of detection at motion detector 44-1, at Step S59. When the determination result at Step S59 is "Yes", CPU 40-1 gives a center notice to terminal device 1A at Step S60. When the determination result at Step S59 is "No", CPU 40-1 determines whether the rectangular image is located in the peripheral part of the screen at Step S61. When the determination result at Step S61 is "Yes", CPU 40-1 gives a range alert notice to terminal device 1A at Step S62.

When Step S60 has been completed, or when Step S62 has been completed, or when the determination result at Step S61 is "No", CPU 40-1 returns to Step S50 and executes the process from Step S50.

When the determination result at Step S52 is "Yes", CPU 40-1 stops camera unit 2 and stops writing image data into image memory 3, at Step S63, then sets up a clipping area of image processor 42 corresponding to the image shooting range of terminal device 1A and causes image processor 42 to perform a clipping operation, at Step S64. Thereafter, CPU 40-1 acquires the image clipped by image processor 42 from image buffer memory 43 and transmits the acquired image from communication unit 5 to terminal device 1A, at Step S65. At Step S66, CPU 40-1 sets image processor 42 to perform a reducing operation, and subsequently activates camera unit 2 at Step S67. After execution of Step S67, CPU 40-1 returns to Step S50 and performs the process from Step S50.

According to the image shooting system of the present exemplary embodiment described heretofore, in terminal device 1B in the sub device mode, operator B can confirm the relationship between the image shooting range of terminal device 1B and the image shooting range of terminal device 1A in the main device mode, based on the displayed position of the rectangular image on the screen. Accordingly, it is possible for operator B to easily make terminal device 1B follow the image shooting of terminal device 1A.

Further, since the determination result on the relationship between the image shooting range of terminal device 1A and the image shooting range of terminal device 1B is notified from terminal device 1B to terminal device 1A, operator A can recognize the tracking status of the terminal device 1B side, from the notice. For example, the image shooting range of terminal device 1A is likely to deviate from the image shooting range of terminal device 1B, terminal device 1B transmits a range alert notice to terminal device 1A. When the image shooting range of terminal device 1A has deviated from the image shooting range of terminal device 1B, terminal device 1B transmits an out-of-range notice to terminal device 1A. Since an alert image corresponding to the range alert notice or the out-of-range notice is displayed in terminal device 1A, operator A can check that alert image to thereby confirm the tracking status on the terminal device 1B side. Therefore, when tracking the subject on terminal device 1B side is delayed, operator A can slow down the moving speed or the panning speed of the camera proportionally so as to make up for the delay of tracking on the terminal device 1B side.

In the system of the present exemplary embodiment, in terminal device 1A in the main device mode, the image of a first angular field clipped from the shot image of camera unit 2 is displayed. On the other hand, in terminal device 1B in the sub device mode, the image of a second angular that is field wider than the first angular field, taken by camera unit 2 is displayed, and the rectangular image corresponding to the image shooting range of the image of the first angular field is displayed on the display screen. Then, based on the displayed position of the rectangular image, the relationship between the image shooting range of terminal device 1A and the image shooting range of terminal device 1B is determined. According to this determination, since an area corresponding to the image of the smaller angular field is detected from the image of the wider angular field, a wide area detectable range can be obtained. In other words, in the system of the present exemplary embodiment, a wider stereo image shooting range can be secured compared to a system in which images of the same angular field are displayed in the individual terminal devices. According to the system of the present exemplary embodiment, for example it is possible to shoot a stereo image even when rectangular image 80B-1 is not located in the center of the display screen in terminal device 1B, as shown in FIG. 7C.

Further, in the system of the present exemplary embodiment, as shown in FIGS. 2 and 3, because operations for image shooting can be allotted to different circuits of terminal device 1A and terminal device 1B, it is thus possible to perform stereo image shooting by reducing power consumption in the system as a whole.

In the system of the present exemplary embodiment, terminal device 1A in the main device mode transmits control data including control values for focus adjustment, white balance control and exposure control to control camera unit 2, to terminal device 1B in the sub device mode. In terminal device 1B, camera unit 2 is controlled based on the control data from terminal device 1A. As a result, it is possible to make the image shooting conditions of camera unit 2 on the terminal device 1B side coincide with the image shooting conditions of camera unit 2 on terminal device 1A, thus it is possible to create a stereo image based on shot images taken under approximately the same image shooting conditions. In addition, because in terminal device 1B in the sub device mode, it is possible to omit exposure control and white balance calculation, it is thus possible to lower the operation load in the entire system and cut down the power consumption.

In the system of the present exemplary embodiment, since image shooting can be performed in two kinds of mode, the high-speed shooting mode and the high-quality shooting mode, it is thus possible to improve convenience in stereo imaging by using different shooting modes for different image shooting scenes. Further, if, in the high-speed shooting mode, a rectangular image with a certain margin from the screen edge is displayed on the screen of terminal device 1B, operator A in terminal device 1A can shoot the image at any shooting timing. On the other hand, in the high-quality shooting mode, a center notice is transmitted from terminal device 1B to terminal device 1A when the rectangular image is provided to the screen center of terminal device 1B, and terminal device 1A starts image shooting and issues an image shoot command at the same time, which causes terminal device 1B to start image shooting. In this way, in this system, since terminal devices 1A and 1B automatically start image shooting when an optimal image shooting range relationship between terminal device 1A and terminal device 1B is obtained, operational load on operators A and B can be alleviated.

Further, in the high-quality shooting mode, terminal devices 1A and 1B each cut out an image of a predetermined angular field from the central part of the associated image taken by camera 2 and form a stereo image based on the thus cut out images of a predetermined angular field, thus making it possible to provide a high-quality stereo image. The following description will be made explaining why a high-quality stereo image can be obtained.

When a subject is shot by a camera, the image of the subject is formed on the image sensor by the lens. In general, the image of the subject formed on the image sensor is affected by lens aberration, so that the influence is also reflected on the image taken by the image sensor.

When a lens is designed, usually, aberration is corrected based on the center of the lens, so that aberration becomes greater in the peripheral part compared to the central part of the lens. Accordingly, image degradation as a result of the influence of aberration appears in the peripheral part of the shot image. For example, spherical aberration makes the shot image unclear in its peripheral part. Chromatic aberration, in particular, chromatic aberration of magnification, produces color blur in the peripheral part of the shot image. Astigmatism makes the shot image unclear in its peripheral part. Curvature of the image surface produces a state in which the shot image is out of focus in its peripheral part, or a so-called blurred state. Distortion aberration produces distortion in the peripheral part of the shot image. Comatic aberration, i.e., spherical aberration arising in off-axis area, makes the shot image unclear in its peripheral part.

Figure 12A:
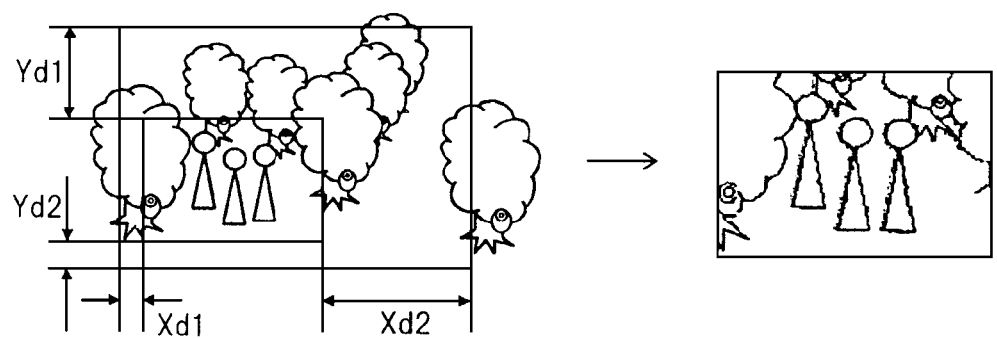
FIG. 12A A schematic diagram showing a state of an image clipped from the peripheral part of a shot image.
Figure 12B:
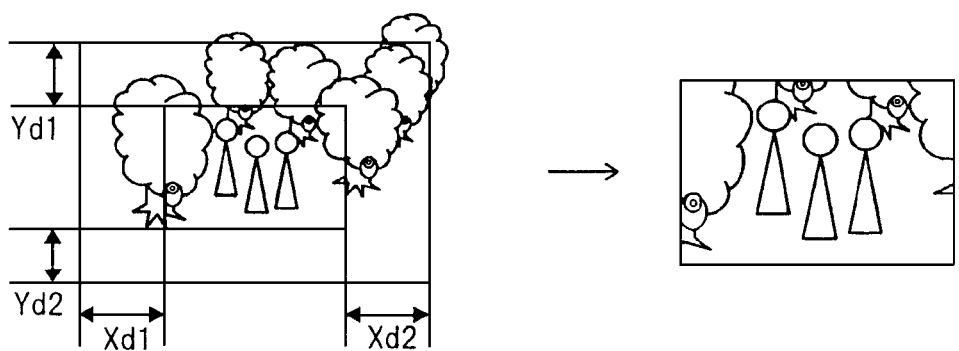
FIG. 12B A schematic diagram showing a state of an image clipped from the central part of a shot image.

FIG. 12A shows the state of an image clipped from the peripheral part of a shot image. FIG. 12B shows an image clipped from the central part of a shot image. In both the image clipped from the peripheral part of the show image shown in FIG. 12A and the image clipped from the central part of the shot image shown in FIG. 12B, three people reside in the center of view.

As shown in FIG. 12A, if an image is clipped from the lower left area of the shot image, the clipped image is affected by aberration in an area other than the upper right part. As a result, for example the people arranged in the center become unclear. On the other hand, when an image is clipped from the central part of the shot image as shown in FIG. 12B, the clipped image is hardly affected by aberration. As a result, a clear image can be obtained.

Since, in the high-quality shooting mode, terminal devices 1A and 1B each clip an image of a predetermined angular field in the central part of the taken image, clear images with less influence from aberration can be obtained as the clipped images. Since a stereo image is formed based on the clear clipped images, it is possible to obtain a high-quality stereo image.

Here, in the high-speed shooting mode, in terminal device 1A a predetermined angular field of image is clipped from the central part of the image taken by camera unit 2 while in terminal device 1B a predetermined angular field of image is clipped from the peripheral part of the image taken by camera unit 2, so as to create a stereo image based on the thus clipped images of a predetermined angular field. In this case, the image quality of the clipped image on the terminal device 1B side is degraded by the influence of aberration. Accordingly, the image quality of the resultant stereo image is less than that in the high-quality shooting mode.

Figure 13:
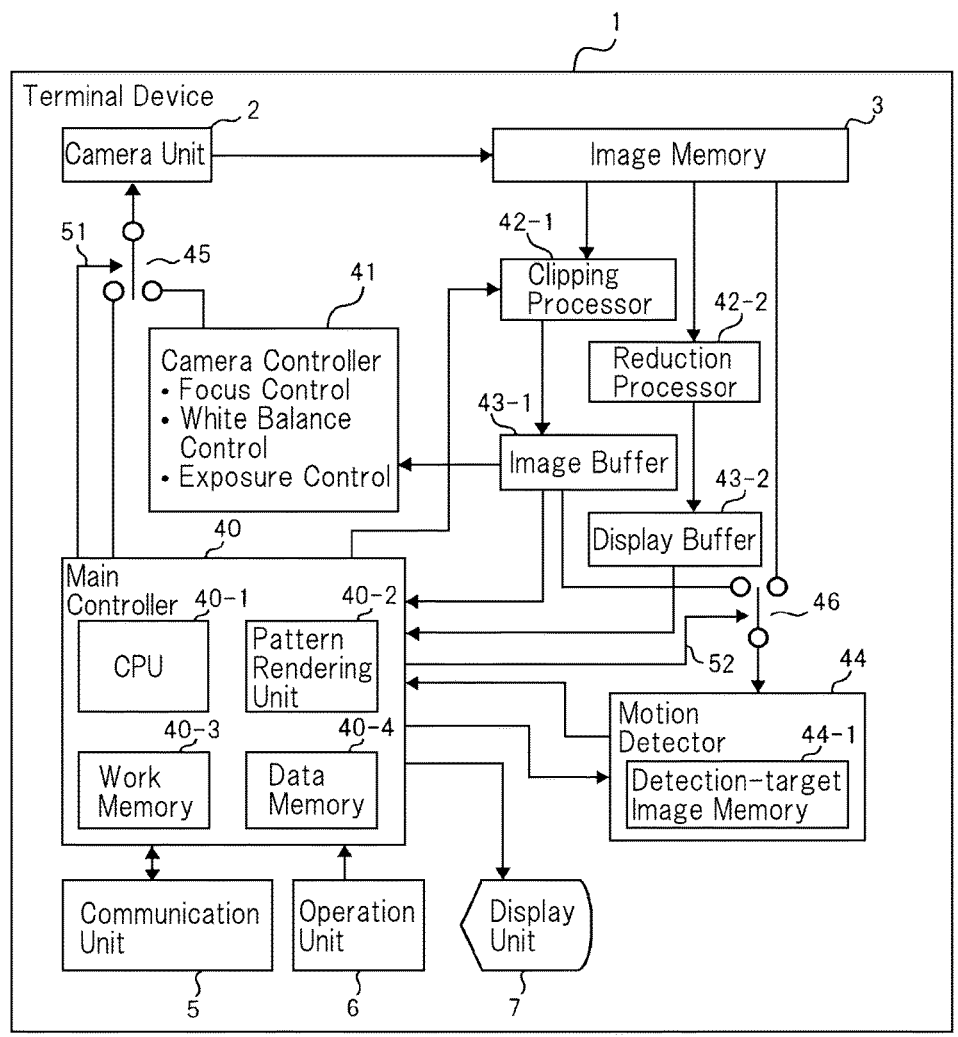
FIG. 13 A block diagram showing a configuration of a terminal device in accordance with the second exemplary embodiment of the present invention.

FIG. 13 shows a configuration of a terminal device in accordance with the second exemplary embodiment.

The basic configuration of terminal device 1 shown in FIG. 13 is the same as that described in the first exemplary embodiment, but differs in that the portion relating to the reduction process and clipping process is duplexed. Specifically, instead of image processor 43, clipping processor 42-1 and reduction processor 42-2 are provided, and instead of image buffer memory 43, image buffer 43-1 and display buffer 43-2 are provided.

Clipping processor 42-1 performs a process corresponding to the clipping process at image processor 43, and image buffer 43-1 retains the clipped image data. Reduction processor 42-2 performs a process corresponding to the reduction process at image processor 43, and display buffer 43-2 retains the reduced image data. The image based on the image data retained in display buffer 43-2 is displayed on display unit 7.

In the present exemplary embodiment, clipping processor 42-1 and reduction processor 42-2 operate in the sub device mode. This configuration makes it possible to perform display of the reduced image and the clipping operation in parallel, to thereby deal with shooting of stereoscopic movies.

The above-described terminal device of the present invention can be applied to mobile phones, smart phones and other mobile phone terminals, and also applied to other terminal devices including an image shooting means and a communication means, such as tablet terminals, notebook PCs, PDAs (Personal Data Assistants), game players, and the like.

The terminal device described in each of the above exemplary embodiments can be configured by dedicated hardware, or may be structured by a computer system in which a computer operates in accordance with a program. The program should be one that can cause the computer to execute, at least, the camera activating processes shown in FIGS. 8 and 9 and the standing-state processes shown in FIGS. 10 and 11. For example, the program causes the computer to execute: a process of receiving the first image of the first angular field from an external terminal device; and a process of determining the image shooting range relationship between the received first image and the second image of the second angular field that is shot by a camera unit, the second angular field being wider than the first angular field. Alternatively, the program causes the computer to execute: a process of displaying, on the display unit, the first image of the first angular field that is shot by the camera unit and transmitting the first image to an external terminal device; and a process of receiving, from the external terminal device, the determination result on the image shooting range relationship between the first image and the second image of the second angular field that is wider than the first angular field and displaying a predetermined image on the display unit in accordance with the determination result.

This program may be provided by using a computer readable recording medium which includes, for example, optical discs such as CD (Compact Disc), DVD (Digital Video Disc) and the like, USB (Universal Service Bus) memory, memory card and the like, or the program may be provided via a communication network (e.g., the internet). Accordingly, the above-described program and computer-readable recording media may be included in the scope of the present invention.

In each exemplary embodiment, stereo image is also called 3D image, three-dimensional image, and stereoscopic image, and is created based on two images, right-eye and left-eye images using binocular parallax.

In each exemplary embodiment, camera unit 2 may have a zooming function. In this case, camera units of terminal devices 1A and 1B should use the same image magnification.

Although the present invention has been explained with reference to the exemplary embodiments, the present invention should not be limited to the above exemplary embodiments. Various modifications that can be understood by those skilled in the art may be made to the structures and details of the present invention within the scope of the present invention. For example, the present invention can take the forms described in the following additions 1 to 33, but should not be limited to these.

This application claims priority based on Japanese Patent Application No. 2012-037348, filed on Feb. 23, 2012, and should incorporate all the disclosure thereof herein.

(Supplementary Note 1)

A terminal device comprising:

an image shooting means;

a communication means that receives a first image of a first angular field from an external terminal device; and a determination means that determines an image shooting range relationship between the first image received by the communication means and a second image of a second angular field shot by the image shooting means, wherein the second angular field is wider than the first angular field.

(Supplementary Note 2)

The terminal device according to SUPPLEMENTARY NOTE 1, wherein the determination means detects an area corresponding to the first image from the second image, and based on the position of the detected area on the second image, determines the image shooting range relationship between the first and second images.

(Supplementary Note 3)

The terminal device according to SUPPLEMENTARY NOTE 2, further comprising a display means, wherein the determination means causes the display means to superpose and display an image that indicates the range of the detected area and the second image.

(Supplementary Note 4)

The terminal device according to SUPPLEMENTARY NOTE 2 or 3, wherein the determination means causes the communication means to transmit a notice indicating the determination result of the image shooting range relationship between the first and second images, to the external terminal device.

(Supplementary Note 5)

The terminal device according to any one of SUPPLEMENTARY NOTES 2 to 4, further comprising a clipping means that clips the detected area from the second image, wherein the determination means causes the communication means to transmit the image clipped by the clipping means, to the external terminal device.

(Supplementary Note 6)

The terminal device according to SUPPLEMENTARY NOTE 2, further comprising:

a display means;

a reduction means that reduces the second image to obtain a reduced image; and a clipping means that clips the detected area from the second image, wherein, the determination means causes the display means to superpose and display an image that indicates the range of the detected area and the reduced image and causes the communication means to transmit the image clipped by the clipping means to the external terminal device.

(Supplementary Note 7)

The terminal device according to any one of SUPPLEMENTARY NOTES 2 to 6, wherein when the detected area is located in the central part of the second image, the determination means causes the communication means to transmit a center notice indicating that the image shooting ranges of the first and second images have such an optimal relationship as to create a stereo image, to the external terminal device.

(Supplementary Note 8)

The terminal device according to any one of SUPPLEMENTARY NOTES 2 to 7, wherein when the detected area is located in the peripheral part of the second image, the determination means causes the communication means to transmit an image shooting range alert notice indicating that the image shooting range of the first image is likely to deviate from the image shooting range of the second image, to the external terminal device.

(Supplementary Note 9)

The terminal device according to any one of SUPPLEMENTARY NOTES 2 to 8, wherein when no area corresponding to the first image can be detected from the second image, the determination means causes the communication means to transmit, to the external terminal device, an out-of-range notice indicating that the image shooting range of the first image is deviated from the image shooting range of the second image.

(Supplementary Note 10)

The terminal device according to SUPPLEMENTARY NOTE 5 or 6, wherein the determination means receives an image shoot command from the external terminal device via the communication means, and causes the clipping means to clip an image in accordance with the image shoot command and causes the communication means to transmit the clipped image to the external terminal device.

(Supplementary Note 11)

The terminal device according to any one of SUPPLEMENTARY NOTES 1 to 10, wherein the determination means receives control data that indicates an image shooting condition of the first image from the external terminal device via the communication means, and controls the image shooting means based on the control data.

(Supplementary Note 12)

A terminal device comprising:

a display means;

an image shooting means;

a communication means that communicates with an external terminal device; and a control means that causes the display means to display a first image of a first angular field that is shot by the image shooting means and causes the communication means to transmit the first image to the external terminal device, wherein the control means receives, from external terminal device via the communication means, a determination result on the image shooting range relationship between the first image and a second image of a second angular field that is wider than the first angular field, and causes the display means to display a predetermined image in accordance with the determination result.

(Supplementary Note 13)

The terminal device according to SUPPLEMENTARY NOTE 12, wherein the determination result is obtained by detecting an area corresponding to the first image from the second image and determining the image shooting range relationship between the first and second images based on the position of the detected area on the second image, wherein a third image that is obtained by clipping the detected area from the second image is received from the external terminal device via the communication means, and wherein a stereo image based on the third image and the first image is displayed on the display means.

(Supplementary Note 14)

The terminal device according to SUPPLEMENTARY NOTE 13, wherein the determination result is a center notice indicating that the detected area is located in the central part of the second image, and wherein when the control means receives a setting of a first shooting mode, the control means first receives the center notice from the external terminal device via the communication means, then receives the third image from the external terminal device via the communication means, and causes the display means to display a stereo image based on the third image and the first image.

(Supplementary Note 15)

The terminal device according to SUPPLEMENTARY NOTE 13 or 14, wherein the determination result is an image shooting range alert notice indicating that the detected area is located in a peripheral part of the second image so that the image shooting range of the first image is likely to deviate from the image shooting range of the second image, and wherein the control means receives the image shooting range alert notice from the external terminal device via the communication means and causes the display means to display a first alert image in accordance with the image shooting range alert notice.

(Supplementary Note 16)

The terminal device according to SUPPLEMENTARY NOTE 15, wherein the determination result is an out-of-range image notice indicating that the image shooting range of the first image is deviated from the image shooting range of the second image when no area corresponding to the first image can be detected from the second image, and the control means receives the out-of-range notice from the external terminal device via the communication means and causes the display means to display a second alert image in accordance with the out-of-range notice.

(Supplementary Note 17)

The terminal device according to SUPPLEMENTARY NOTE 16, further comprising a shutter button, wherein in a case in which the control means receives a setting of a second shooting mode and receives neither the image shooting range alert notice nor the out-of-range notice, the control means causes the communication means to transmit an image shoot command to the external terminal device when the shutter button is pressed down, and the control means, after transmission of the image shooting command, receives the third image clipped in accordance with the image shooting command from the external terminal device via the communication means, and causes the display means to display a stereo image based on the third image and the first image.

(Supplementary Note 18)

The terminal device according to any one of SUPPLEMENTARY NOTES 12 to 17, wherein the control means causes the communication means to transmit control data indicating the image shooting conditions of the image shooting means to the external terminal device.

(Supplementary Note 19)

An image shooting system comprising:

a first image shooting device; and a second image shooting device that can communicate with the first image shooting device, wherein the first image shooting device includes:

a first image shooting means; and a first communication means that transmits a first image of a first angular field that is shot by the first image shooting means, and wherein the second image shooting device includes:

a second image shooting means;

a second communication means that receives the first image from the first communication means; and a determination means that determines an image shooting range relationship between the first image received by the second communication means and a second image of a second angular field that is shot by the second image shooting means, the second angular field being wider than the first angular field.

(Supplementary Note 20)

The image shooting system according to SUPPLEMENTARY NOTE 19, wherein the determination means detects an area corresponding to the first image from the second image, and based on the position of the detected area on the second image, determines the image shooting range relationship between the first and second images.

(Supplementary Note 21)

The image shooting system according to SUPPLEMENTARY NOTE 20, wherein the second image shooting device further comprises a display means, and the determination means causes the display means to superpose and display an image that indicates the range of the detected area and the second image.

(Supplementary Note 22)

The image shooting system according to SUPPLEMENTARY NOTE 20 or 21, wherein the determination means causes the second communication means to transmit a notice that indicates a determination result on the image shooting range relationship between the first and second images to the first image shooting terminal device, and wherein the first image shooting device further includes a first display means and a control means that receives the notice via the first communication means and causes the first display means to display a predetermined image in accordance with the notice.

(Supplementary Note 23)

The image shooting system according to SUPPLEMENTARY NOTE 22, wherein the second image shooting device further includes a clipping means that clips the detected area from the second image, wherein the determination means causes the communication means to transmit a third image that is clipped by the clipping means to the first image shooting device, and wherein the control means receives the third image via the first communication means and causes the first display means to display a stereo image based on the third image and the first image.

(Supplementary Note 24)

The image shooting system according to SUPPLEMENTARY NOTE 23, wherein when the detected area is located in a central part of the second image, the determination means causes the second communication means to transmit a center notice indicating that the image shooting ranges of the first and second images have such an optimal relationship as to create a stereo image, to the first image shooting device, and wherein when the control means receives a setting of a first shooting mode, the control means first receives the center notice from the second image shooting device via the first communication means, then receives the third image from the second image shooting device via the first communication means, and causes the first display means to display a stereo image based on the third image and the first image.

(Supplementary Note 25)

The image shooting system according to SUPPLEMENTARY NOTE 24, wherein when the detected area is located in a peripheral part of the second image, the determination means causes the second communication means to transmit an image shooting range alert notice indicating that the image shooting range of the first image is likely to deviate from the image shooting range of the second image, to the first image shooting device, and wherein the control means receives the image shooting range alert notice from the second image shooting device via the first communication means and causes the first display means to display a first alert image in accordance with the image shooting range alert notice.

(Supplementary Note 26)

The image shooting system according to SUPPLEMENTARY NOTE 25, wherein when no area corresponding to the first image can be detected from the second image, the determination means causes the second communication means to transmit an out-of-range notice indicating that the image shooting range of the first image is deviated from the image shooting range of the second image to the first image shooting device, and wherein the control receives the out-of-range notice from the second image shooting device via the first communication means and causes the first display means to display a second alert image in accordance with the out-of-range notice.

(Supplementary Note 27)

The image shooting system according to SUPPLEMENTARY NOTE 26, wherein the first image shooting device further comprises a shutter button, wherein in a case in which the control means receives a setting of a second shooting mode and receives neither the image shooting range alert notice nor the out-of-range notice, the control means causes the first communication means to transmit an image shoot command to the second image shooting device when the shutter button is pressed down, wherein the determination means receives the image shoot command via the second communication means, and causes the clipping means to clip the third image in accordance with the image shoot command and causes the second communication means to transmit the third image to the first image shooting device, and wherein the control means receives the third image via the first communication means and causes the first display means to display a stereo image based on the third image and the first image.

(Supplementary Note 28)

The image shooting system according to any one of SUPPLEMENTARY NOTES 22 to 27, wherein the control means causes the first communication means to transmit control data that indicates an image shooting condition of the first image shooting means to the second image shooting device, and wherein the determination means receives the control data via the second communication means and controls the second image shooting means based on the control data.

(Supplementary Note 29)

An image shooting method comprising:

receiving a first image of a first angular field from an external terminal device; and determining an image shooting range relationship between the received first image and a second image of a second angular field that is shot by an image shooting means, the second angular field being wider than the first angular field.

(Supplementary Note 30)

An image shooting method comprising:

displaying a first image of a first angular field that is shot by an image shooting means on a display means and transmitting the first image to an external terminal device; and receiving, from the external terminal device, a result of determination on an image shooting range determination between the first image and a second image of a second angular field that is wider than the first angular field and causing the display means to display a predetermined image in accordance with the determination result.

(Supplementary Note 31)

An image shooting method comprising:

a first image shooting device that includes a first image shooting means transmitting, to a second image shooting device that includes a second image shooting means, a first image of a first angular field that is shot by the first image shooting means; and the second image shooting device determining an image shooting range relationship between the first image that is received from the first image shooting device and a second image of a second angular field that is shot by the second image shooting means, the second angular field being wider than the first angular field.

(Supplementary Note 32)

A program for causing a computer to execute: a process of receiving a first image of a first angular field from an external terminal device; and a process of determining an image shooting range relationship between the received first image and a second image of a second angular field that is shot by an image shooting means, the second angular field being wider than the first angular field.

(Supplementary Note 33)

A program for causing a computer to execute: a process of causing a display means to display a first image of a first angular field that is shot by an image shooting means and transmitting the first image to an external terminal device; and a process of receiving, the external terminal device, a result of determination on an image shooting range relationship between the first image and a second image of a second angular field that is wider than the first angular field and causing the display means to display a predetermined image in accordance with the determination result.

DESCRIPTION OF REFERENCE NUMERALS 1 terminal device
2 camera unit
3 image memory
4 control unit
5 communication unit
6 operation unit
7 display unit
40 main controller
40-1 CPU
40-2 pattern rendering unit
40-3 work memory
40-4 data memory
41 camera controller
42 image processor
43 image buffer memory
44 motion detector
44-1 detection-target image memory
45, 46 switch
51, 52 selection signal
53 shutter button

The invention claimed is:

1. A terminal device, comprising:
   an image shooting device;
   a display device;
   a communication device that receives a first image having a first field angle from an external terminal device with an image shooting function; and
   a controller, configured to operate as a determination unit that determines a correspondence relation between an image shooting range of the external terminal device and that of the image shooting device based on corresponding image areas between the first image received by the communication device and a second image having a second field angle shot by the image shooting device, the second field angle being wider than the first field angle, wherein the determination unit detects an area corresponding to the first image from the second image, and based on the position of the detected area on the second image, determines the image shooting range relationship between the first and second images, and wherein the determination unit causes the display device to superpose and display an image that indicates the range of the detected area and the second image.

2. The terminal device according to claim 1, wherein the determination unit causes the communication device to transmit a notice indicating the determination result of the image shooting range relationship between the first and second images to the external terminal device.

3. The terminal device according to claim 1,
wherein the controller is further configured to operate as a clipping unit that clips the detected area from the second image, and
wherein the determination unit causes the communication device to transmit the image clipped by the clipping unit to the external terminal device.

4. The terminal device according to claim 1,
wherein the controller is further configured to operate as a reduction unit that reduces the second image to obtain a reduced image, and
a clipping unit that clips the detected area from the second image,
and wherein the determination unit causes the display device to superpose and display the image that indicates the range of the detected area and the reduced image, and causes the communication device to transmit the image clipped by the clipping unit to the external terminal device.

5. An image shooting system comprising:
a display device;
a first image shooting device; and
a second image shooting device that can communicate with the first image shooting device,
wherein the first image shooting device includes:
a first image sensor; and
a first communication device that transmits a first image of a first field angle that is shot by the first image sensor,
wherein the second image shooting device includes:
a second image sensor;
a second communication device that receives the first image from the first communication device; and
a controller that controls operation of the second image shooting device, the controller configured to operate as a determination unit that determines a correspondence relation between an image shooting range of the external terminal device and that of the image shooting device based on corresponding image areas between the first image received by the second communication device and a second image having a second field angle that is shot by the second image sensor, the second field angle being wider than the first field angle,
wherein the determination unit detects an area corresponding to the first image from the second image, and based on the position of the detected area on the second image, determines the image shooting range relationship between the first and second images, and wherein the determination unit causes the display device to superpose and display an image that indicates the range of the detected area and the second image.

6. An image shooting method, comprising:
receiving a first image of a first field angle from an external terminal device;
determining a correspondence relation between an image shooting range of the external terminal device and that of an image shooting device, different from the external terminal device, based on corresponding image areas between the received first image and a second image of a second field angle that is shot by the image shooting device, the second field angle being wider than the first field angle;
detecting an area corresponding to the first image from the second image, and based on the position of the detected area on the second image, determines the image shooting range relationship between the first and second images; and
causing a display device to superpose and display an image that indicates the range of the detected area and the second image.

7. An image shooting method, comprising:
displaying a first image of a first field angle, shot by an image shooting device, on a display device;
transmitting the first image to an external terminal device;
receiving, from the external terminal device, a result of a determination of a correspondence relation between an image shooting range of the external terminal device and that of the image shooting device based on corresponding image areas between the first image and a second image of a second field angle that is wider than the first angular field; and
causing the display device to display a predetermined image in accordance with the determination result, the predetermined image comprising an image that indicates a range of a detected area and the second image, the detected area being an area corresponding to the first image from the second image, and said determination including an image shooting range relationship between the first and second images based on the position of the detected area on the second image.

8. A program recorded on a non-transient, computer-readable medium that, upon being read and executed by a computer, causes the computer to execute:
a process of receiving a first image of a first field angle from an external terminal device;
a process of determining a correspondence relation between an image shooting range of the external terminal device and that of an image shooting device, different from the external terminal device, based on corresponding image areas between the received first image and a second image of a second field angle that is shot by an image shooting device, the second field angle being wider than the first field angle;
a process of detecting an area corresponding to the first image from the second image, and based on the position of the detected area on the second image, determines the image shooting range relationship between the first and second images; and
a process of causing a display device to superpose and display an image that indicates the range of the detected area and the second image.

9. The terminal device according to claim 2,
wherein the controller is further configured to operate as a clipping unit that clips the detected area from the second image, and
wherein the determination unit causes the communication device to transmit the image clipped by the clipping unit to the external terminal device.

* * * * *